(12) United States Patent
Yamauchi et al.

(10) Patent No.: US 10,750,667 B2
(45) Date of Patent: Aug. 25, 2020

(54) ROBOTIC LAWN MOWING BOUNDARY DETERMINATION

(71) Applicant: iRobot Corporation, Bedford, MA (US)

(72) Inventors: Brian Yamauchi, Cambridge, MA (US); Andrew Beaulieu, Somerville, MA (US); Paul C. Balutis, Shrewsbury, MA (US)

(73) Assignee: iRobot Corporation, Bedford, MA (US)

( * ) Notice: Subject to any disclaimer, the term of this patent is extended or adjusted under 35 U.S.C. 154(b) by 201 days.

(21) Appl. No.: 15/850,413

(22) Filed: Dec. 21, 2017

(65) Prior Publication Data

US 2018/0168097 A1 Jun. 21, 2018

Related U.S. Application Data

(63) Continuation of application No. 15/371,618, filed on Dec. 7, 2016, now Pat. No. 9,854,737, which is a
(Continued)

(51) Int. Cl.
*A01D 34/00* (2006.01)
*G05D 1/02* (2020.01)
(Continued)

(52) U.S. Cl.
CPC .......... *A01D 34/008* (2013.01); *A01B 69/008* (2013.01); *G05D 1/0212* (2013.01);
(Continued)

(58) Field of Classification Search
None
See application file for complete search history.

(56) References Cited

U.S. PATENT DOCUMENTS 2,751,030 A 6/1956 Null
3,128,840 A 4/1964 Barrett
(Continued)

FOREIGN PATENT DOCUMENTS

DE 19932552 2/2000
EP 0792726 9/1997
(Continued)

OTHER PUBLICATIONS

Japanese Office Action in Japanese Appln. No. 2016-575411, dated Jul. 1, 2019, 16 pages (with English translation).
(Continued)

*Primary Examiner* — Richard M Camby
(74) *Attorney, Agent, or Firm* — Fish & Richardson P.C.

(57) ABSTRACT

A method of mowing an area with an autonomous mowing robot comprises storing, in non-transient memory of the robot, a set of geospatially referenced perimeter data corresponding to positions of the mowing robot as the mowing robot is guided about a perimeter of an area to be mowed, removing from the set of perimeter data one or more data points thereby creating a redacted data set and controlling the mowing robot to autonomously mow an area bounded by a boundary corresponding to the redacted data set, including altering direction of the mowing robot at or near a position corresponding to data in the redacted data set so as to redirect the robot back into the bounded area.

14 Claims, 18 Drawing Sheets

Related U.S. Application Data continuation of application No. 14/512,098, filed on Oct. 10, 2014, now Pat. No. 9,516,806.

(51) Int. Cl.
*A01B 69/04* (2006.01)
*A01D 101/00* (2006.01)

(52) U.S. Cl.
CPC ......... *G05D 1/0219* (2013.01); *G05D 1/0221* (2013.01); *G05D 1/0236* (2013.01); *A01D 2101/00* (2013.01); *G05D 2201/0208* (2013.01); *Y10S 901/01* (2013.01)

(56) References Cited

U.S. PATENT DOCUMENTS

| | | |
|---|---|---|
| 3,385,041 A | 5/1968 | Douglas |
| 3,457,575 A | 7/1969 | Bienek |
| 3,550,714 A | 12/1970 | Bellinger |
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,369,543 A | 1/1983 | Chen et al. |
| 4,513,469 A | 4/1985 | Godfrey et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,777,416 A | 10/1988 | George, II et al. |
| 4,782,550 A | 11/1988 | Jacobs |
| 4,811,228 A | 3/1989 | Hyyppa |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Stearns et al. |
| 5,163,202 A | 11/1992 | Kawakami et al. |
| 5,163,273 A | 11/1992 | Wojtkowski et al. |
| 5,165,064 A | 11/1992 | Mattaboni |
| 5,170,352 A * | 12/1992 | McTamaney ........ G05D 1/0236 318/587 |
| 5,204,814 A | 4/1993 | Noonan et al. |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,279,672 A | 1/1994 | Betker, Jr. et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,213 A | 10/1997 | Schmutz |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,787,545 A | 8/1998 | Colens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 | 7/2001 | Peless et al. |
| 6,259,979 B1 | 7/2001 | Holmquist |
| 6,278,918 B1 * | 8/2001 | Dickson ............... A01B 69/001 701/23 |

(56) References Cited

U.S. PATENT DOCUMENTS

| | | |
|---|---|---|
| 6,285,930 B1 | 9/2001 | Dickson et al. |
| 6,300,737 B1 | 10/2001 | Begvall et al. |
| D451,931 S | 12/2001 | Peless et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 * | 9/2002 | Levin .................. A01D 34/008 293/4 |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Colens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Van Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Raffner |
| 6,615,108 B1 | 9/2003 | Peless et al. |
| 6,658,693 B1 | 12/2003 | Reed, Jr. |
| 6,661,239 B1 | 12/2003 | Ozik |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| 6,901,624 B2 | 6/2005 | Mori et al. |
| D510,066 S | 9/2005 | Hickey et al. |
| 6,938,298 B2 | 9/2005 | Aasen |
| 6,940,291 B1 | 9/2005 | Ozik |
| 6,956,348 B2 | 10/2005 | Landry et al. |
| 6,971,140 B2 | 12/2005 | Kim |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,729,801 B2 | 6/2010 | Abramson |
| 8,046,103 B2 | 10/2011 | Abramson et al. |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 9,043,952 B2 | 6/2015 | Sandin et al. |
| 9,043,953 B2 | 6/2015 | Sandin et al. |
| 10,188,029 B1 * | 1/2019 | Brown .................. A01D 34/008 |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0049517 A1 | 4/2002 | Ruffner |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0019071 A1 | 5/2003 | Field et al. |
| 2003/0120389 A1 | 6/2003 | Abramson et al. |
| 2003/0137268 A1 | 7/2003 | Papanikolopoulos et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0097952 A1 | 5/2005 | Steph |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0204717 A1 | 9/2005 | Colens |
| 2005/0251292 A1 | 11/2005 | Casey et al. |
| 2005/0278094 A1 | 12/2005 | Swinbanks et al. |
| 2005/0287038 A1 | 12/2005 | Dubrovsky et al. |
| 2006/0293794 A1 | 12/2006 | Harwig et al. |
| 2007/0016328 A1 | 1/2007 | Ziegler et al. |
| 2007/0142964 A1 | 6/2007 | Abramson |
| 2007/0150109 A1 | 6/2007 | Peless et al. |
| 2008/0039974 A1 | 2/2008 | Sandin et al. |

(56) References Cited

U.S. PATENT DOCUMENTS

| | | | |
|---|---|---|---|
| 2008/0097645 | A1 | 4/2008 | Abramson et al. |
| 2008/0167753 | A1 | 7/2008 | Peless et al. |
| 2008/0183349 | A1 | 7/2008 | Abramson et al. |
| 2009/0254218 | A1 | 10/2009 | Sandin et al. |
| 2010/0059000 | A1 | 3/2010 | Bergquist |
| 2010/0102525 | A1 | 4/2010 | Fancher |
| 2011/0130875 | A1 | 6/2011 | Abramson |
| 2011/0234153 | A1 | 9/2011 | Abramson |
| 2012/0041594 | A1 | 2/2012 | Abramson et al. |
| 2012/0226381 | A1 | 9/2012 | Abramson et al. |
| 2012/0290165 | A1 | 11/2012 | Ouyang |
| 2013/0006419 | A1 | 1/2013 | Bergstrom et al. |
| 2013/0030609 | A1 | 1/2013 | Jagenstedt |
| 2013/0066484 | A1 | 3/2013 | Markusson et al. |
| 2013/0076304 | A1 | 3/2013 | Andersson et al. |
| 2013/0110322 | A1 | 5/2013 | Jagenstedt et al. |
| 2013/0152538 | A1 | 6/2013 | Fiser et al. |
| 2013/0184924 | A1 | 7/2013 | Jagenstedt et al. |
| 2013/0249179 | A1 | 9/2013 | Bums |
| 2013/0274920 | A1 | 10/2013 | Abramson et al. |
| 2014/0102061 | A1 | 4/2014 | Sandin et al. |
| 2014/0102062 | A1 | 4/2014 | Sandin et al. |
| 2014/0117892 | A1 | 5/2014 | Coates |
| 2015/0006015 | A1 | 1/2015 | Sandin et al. |
| 2016/0100521 | A1* | 4/2016 | Halloran .............. G01S 17/06 180/169 |
| 2017/0188510 | A1* | 7/2017 | Einecke .............. G06T 7/70 |
| 2017/0308091 | A1* | 10/2017 | Bunderson .......... G05D 1/0219 |
| 2018/0168097 | A1 | 6/2018 | Yamauchi et al. |

FOREIGN PATENT DOCUMENTS

| | | |
|---|---|---|
| EP | 0774702 | 10/2001 |
| EP | 1331537 | 7/2003 |
| EP | 1704766 | 9/2006 |
| EP | 2946650 | 11/2015 |
| FR | 2828589 | 2/2003 |
| GB | 2142447 | 1/1985 |
| GB | 2283838 | 5/1995 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 26312 U | 1/1990 |
| JP | 3051023 | 3/1991 |
| JP | 2003-201903 | 9/1991 |
| JP | 04320612 | 11/1992 |
| JP | 06327598 | 11/1994 |
| JP | 07129239 | 5/1995 |
| JP | 7295636 | 11/1995 |
| JP | 816776 | 1/1996 |
| JP | 08089451 | 4/1996 |
| JP | 2008-163905 | 6/1996 |
| JP | 8152916 | 6/1996 |
| JP | 09179625 | 7/1997 |
| JP | 9185410 | 7/1997 |
| JP | 11508810 | 8/1999 |
| JP | 11510935 | 9/1999 |
| JP | 2001258807 | 9/2001 |
| JP | 2001275908 | 10/2001 |
| JP | 2001525567 | 12/2001 |
| JP | 2002078650 | 3/2002 |
| JP | 2002204768 | 7/2002 |
| JP | 3323772 | 9/2002 |
| JP | 3356170 | 10/2002 |
| JP | 2002532178 | 10/2002 |
| JP | 3375843 | 11/2002 |
| JP | 2002323925 | 11/2002 |
| JP | 2002355206 | 12/2002 |
| JP | 2002360471 | 12/2002 |
| JP | 2002360482 | 12/2002 |
| JP | 2003005296 | 1/2003 |
| JP | 2003010076 | 1/2003 |
| JP | 2003036116 | 2/2003 |
| JP | 2003038401 | 2/2003 |
| JP | 2003038402 | 2/2003 |
| JP | 2003505127 | 2/2003 |
| JP | 2003061882 | 3/2003 |
| JP | 2003-191797 | 7/2003 |
| JP | 2003-256047 | 9/2003 |
| JP | 2003310489 | 11/2003 |
| JP | 2009-049729 | 3/2009 |
| WO | WO 1995/026512 | 10/1995 |
| WO | WO 1997/040734 | 11/1997 |
| WO | WO 1997/041451 | 11/1997 |
| WO | WO 1998/053456 | 11/1998 |
| WO | WO 1999/016078 | 4/1999 |
| WO | WO 1999/028800 | 6/1999 |
| WO | WO 1999/038056 | 7/1999 |
| WO | WO 1999/038237 | 7/1999 |
| WO | WO 1999/059042 | 11/1999 |
| WO | WO 2000/036962 | 6/2000 |
| WO | WO 2000/038026 | 6/2000 |
| WO | WO 2000/038029 | 6/2000 |
| WO | WO 2000/004430 | 10/2000 |
| WO | WO 2000/078410 | 12/2000 |
| WO | WO 2001/006904 | 2/2001 |
| WO | WO 2001/006905 | 2/2001 |
| WO | WO 2002/39864 | 5/2002 |
| WO | WO 2002/39868 | 5/2002 |
| WO | WO 2002/058527 | 8/2002 |
| WO | WO 2002/062194 | 8/2002 |
| WO | WO 2002/067744 | 9/2002 |
| WO | WO 2002/067745 | 9/2002 |
| WO | WO 2002/074150 | 9/2002 |
| WO | WO 2002/075356 | 9/2002 |
| WO | WO 2002/075469 | 9/2002 |
| WO | WO 2002/075470 | 9/2002 |
| WO | WO 2002/101477 | 12/2002 |
| WO | WO 2003/026474 | 4/2003 |
| WO | WO 2003/040845 | 5/2003 |
| WO | WO 2003/040846 | 5/2003 |
| WO | WO 2003/065140 | 8/2003 |
| WO | WO 2004/004533 | 1/2004 |
| WO | WO 2004/006034 | 1/2004 |
| WO | WO 2004/058028 | 1/2004 |
| WO | WO 2005/055795 | 6/2005 |
| WO | WO 2005/077244 | 8/2005 |
| WO | WO 2006/068403 | 6/2006 |

OTHER PUBLICATIONS

Angle et al., U.S. Appl. No. 60/177,703, filed Jan. 24, 2000, accessed Jul. 11, 2012, 16 pages.
Bohn et al. "Super-distributed RFID Tag Infrastructures," Lecture Notes in Computer Science, Springer Verlag, Berlin, DE, vol. 3295, Nov. 11, 2004, pp. 1-12.
Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.
Caracciolo et al., "Trajectory Tracking Control of a Four-Wheel Differentially Driven Mobile Robot," IEEE Int. Conf. Robotics and Automation, Detroit, MI, 1999, pp. 2632-2638.
Casey et al., U.S. Appl. No. 60/582,992, filed Jun. 25, 2004, accessed Jul. 11, 2012, 24 pages.
Domnitcheva "Smart Vacuum Cleaner—An Autonomous Location-Aware Cleaning Device," Proceedings of the International Conference on Ubiquitous Computing, Sep. 10, 2004, pp. 1-2.
Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.
"Electrolux—Designed for the well-lived home (Welcome to the Electrolux Trilobite)," Retrieved from the Internet: URL<http://www.electroluxusa.com/node57.as[?currentURL=node142.asp%3F>. Accessed Mar. 2005, 2 pages.
"EVac Robotic Vacuum," S1727 Instruction Manual, Sharper Image Corp, Copyright 2004, 13 pages.
Everyday Robots, "Everyday Robots: Reviews, Discussion and News for Consumers," Aug. 2004, Retrieved from the Internet:

(56) References Cited

OTHER PUBLICATIONS

URL<www.everydayrobots.com/index.php?option=content&task=view&id=9>, retrieved Sep. 2012, 4 pages.
Evolution Robotics, "NorthStar—Low-cost Indoor Localization—How it Works," E Evolution Robotics, 2005, 2 pages.
Facts on Trilobite, webpage, Retrieved from the Internet: URL<http://trilobiteelectroluxse/presskit_en/mode111335asp?print=yes&pressID=>, accessed Dec. 2003, 2 pages.
Final Office Action issued in U.S. Appl. No. 11/688,225, dated Nov. 10, 2011, 45 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
Hicks and Hall, "A Survey of Robot Lawn Mowers", http://www.robotics.uc.edu/papers/paper2000/lawnmower.pdf, 2000, 8 pages.
Hitachi: News release: "The home cleaning robot of the autonomous movement type (experimental machine) is developed," May 29, 2003, Retrieved from the Internet: URL<www.i4u.com./japanreleases/hitachirobot.htm>, retrieved Mar. 2005, 5 pages.
International Preliminary Report on Patentability dated Sep. 23, 2008 from International Application No. PCT/US2007/064326, dated Sep. 23, 2008, 10 pages.
International Preliminary Report on Patentability issued in International Application No. PCT/US2007/064323, dated Sep. 23, 2008, 10 pages.
International Search Report and Written Opinion issued in PCT/US2007/064326, dated Jul. 17, 2008, 6 pages.
International Search Report and Written Opinion issued in PCT/US2007/064323, dated Jun. 16, 2008, 14 pages.
Invitation to Pay Additional Fees issued in International Application No. PCT/US2007/064326, dated Apr. 18, 2008, 9 pages.
Kahney, "Wired News: Robot Vacs are in the House," Jun. 2003, Retrieved from the Internet: URL<www.wired.com/news/technology/o,1282,59237,00.html>, accessed Mar. 2005, 5 pages.
Karcher "Karcher RoboCleaner RC 3000," Retrieved from the Internet: URL<www.robocleaner.de/english/screen3.html>, 4 page, Dec. 2003.
Karcher, RC 3000 Cleaning Robot-User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher USA, "RC3000 Robotic Cleaner," 2005, Retrieved from the Internet: URL <http://www.karcher-usa.com/showproducts.php?op=viewprod&param1=143&param2=&param3=>, accessed Mar. 2005, 3 pages.
Karcher, "Product Manual Download 'Karch'," available at www.karcher.com, 2004, 16 pages.
Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.
Kozlowski and Pazderski, "Modeling and Control of a 4-wheel Skid-steering Mobile Robot," International J. of Applied Mathematics and Computer Science, 2004, 14(4):477-496.
Kubitz et al., "Application of radio frequency identification devices to support navigation of autonomous mobile robots" Vehicular Technology Conference, vol. 1, May 4, 1997, pp. 126-130.
Koolvac Robotic Vacuum Cleaner Owner's Manual, Koolatron, 2004, 13 pages.
Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.
Morland, "Autonomous Lawnmower Control," Downloaded from the internet at: http://cns.bu.edu/~cjmorlan/robotics/lawnmower/report.pdf, Jul. 2002, 10 pages.
Non-final Office Action issued in U.S. Appl. No. 11/688,213, dated Jan. 27, 2011, 27 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 12/488,094, dated Jul. 28, 2011, 13 pages.
On Robo, "Robot Reviews Samsung Robot Vacuum (VC-RP30W)," 2005, Retrieved from the Internet: URL<www.onrobo.com/reviews/AT_Home/vacuum_cleaners/on00vcrb30rosam/index.htm>, accessed Mar. 2005, 2 pages.
"Put Your Roomba . . . On, Automatic" webpages: http://www.acomputeredge.com/roomba, accessed Apr. 2005, 3 pages.
RoboMaid Sweeps Your Floors So You Won't Have to, the Official Site, Retrieved from the Internet: URL<http://therobomaid.com/>, accessed Mar. 2005, 2 pages.
Robotic Vacuum Cleaner-Blue, Retrieved from the Internet: URL<http://www.shamerimage.com/us/en/catalog/productview.jhtml?sku=S1727BLU>, accessed Mar. 2005, 2 pages.
Schofield, "Neither Master nor Slave—A Practical Study in the Development and Employment of Cleaning Robots," Emerging Technologies and Factory Automation, 1999 Proceedings ETFA '99 1999 7th IEEE International Conference on Barcelona, Spain, Oct. 1999, pp. 1427-1434.
TheRobotStore.com, "Friendly Robotics Robotic Vacuum RV400—The Robot Store," URL<www.therobotstore.com/s.nl/sc.9/category.-109/it.A/id.43/1>, accessed Apr. 2005, 1 page.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.
"Zoombot Remote Controlled Vaccuum-RV-500 NEW Roomba 2," eBay website: http://cgi.ebay.com/ws/eBayISAPI.dll?ViewItem&category=43526&item=4373497618&rd=1, accessed Apr. 2005, 7 pages.
International Search Report and Written Opinion in International Application No. PCT/US2015/050775, dated Dec. 23, 2015, 12 pages.
International Preliminary Report on Patentability in International Application No. PCT/US2015/050775, dated Apr. 11, 2017, 8 pages.

\* cited by examiner

ROBOTIC LAWN MOWING BOUNDARY DETERMINATION

TECHNICAL FIELD

This invention relates to an autonomous mobile robot for grass cutting.

BACKGROUND

Autonomous robots that perform household functions such as floor cleaning and lawn cutting are now readily available consumer products. Commercially successful robots are not unnecessarily complex, and generally operate randomly within a confined area. In the case of floor cleaning, such robots are generally confined within (i) touched walls and other obstacles within the rooms of a dwelling, (ii) IR-detected staircases (cliffs) leading downward; and/or (iii) user-placed detectable barriers such as directed IR beams, physical barriers or magnetic tape. Walls provide much of the confinement perimeter. Other robots may try to map the dwelling using a complex system of sensors and/or active or passive beacons (e.g., sonar, RFID or bar code detection, or various kinds of machine vision).

Some autonomous robotic lawn mowers use a continuous boundary marker (e.g., a boundary wire) for confining random motion robotic mowers. The boundary wire is intended to confine the robot within the lawn or other appropriate area, so as to avoid damaging non-grassy areas of the yard or intruding onto a neighboring property. The boundary marker is typically a continuous electrically conductive loop around the property to be mowed. Although the guide conductor can be drawn into the property in peninsulas to surround gardens or other off-limit areas, it remains a continuous loop, and is energized with an AC current detectable as a magnetic field at a distance of a few feet. The guide conductor loop must be supplied with power, usually from a wall socket. Within the bounded area, a mowing robot may "bounce" randomly as the robot nears the guide conductor, or may follow along the guide conductor. Some mowers also touch and bounce from physical barriers.

SUMMARY

In some implementations of this disclosure, a method of mowing an area with an autonomous mowing robot, the method comprises storing, in non-transient memory of the robot, a set of geospatially referenced perimeter data corresponding to positions of the mowing robot as the mowing robot is guided about a perimeter of an area to be mowed, removing from the set of perimeter data one or more data points thereby creating a redacted data set, and controlling the mowing robot to autonomously mow an area bounded by a boundary corresponding to the redacted data set, including altering direction of the mowing robot at or near a position corresponding to data in the redacted data set so as to redirect the robot back into the bounded area. In some aspects, prior to storing the geospatially referenced data, determining locations of discrete markers along the perimeter of the area to be mowed. The geospatially referenced data are geospatially referenced as the mowing robot is guided about the perimeter in relation to the discrete markers. Prior to removing data points from the set of perimeter data, determining the reference point from a location of the mowing robot within the area to be mowed. The method comprises prompting an operator to position the mowing robot within the area to be mowed and to then initiate reference point determination. The boundary corresponding to the redacted data set is an interior boundary or an exterior boundary of the area to be mowed is determined from the location of the reference point with respect to the boundary.

In other aspects of this disclosure, the method includes storing the geospatially referenced perimeter data comprises marking cells of a two-dimensional data array as corresponding to the positions of the mowing robot. Also possible is removing the one or more data points comprises altering entries in one or more marked cells to indicate that such cells do not correspond to perimeter locations. The data points to be removed are BOUNDARY cells that are not adjacent to both MOWABLE and NON-MOWABLE cells. Storing the set of perimeter data comprises determining whether the mowing robot is being guided in a forward or a backward direction, and pausing data storage while the mowing robot is being guided in the backward direction. Prior to controlling the robot to autonomously mow the area, determining whether the stored perimeter data represents a continuous path. The method can include adding data points to fill any path gaps of less than a predetermined width. Upon determining that the stored perimeter data represents a discontinuous path defining a gap of more than a predetermined width, signaling an operator to resume guidance of the mowing robot about the perimeter and storing additional perimeter data during resumed guidance. Prior to controlling the robot to autonomously mow the area, altering a portion of the stored perimeter data set corresponding to a perimeter path segment defining an interior angle less than 135 degrees, to define a smoothed boundary. The storage of the set of perimeter data is paused while the guided mowing robot remains stationary for less than a predetermined time interval, and resumes upon motion of the mowing robot. The storage of the set of perimeter data is concluded in response to the guided mowing robot remaining stationary for more than the predetermined time interval. Controlling the mowing robot to autonomously mow the area comprises determining whether the mowing robot is within a predetermined distance from the boundary, and in response to determining that the mowing robot is within the predetermined distance, slowing a mowing speed of the robot. The perimeter is an external perimeter circumscribing the area to be mowed. The perimeter is an internal boundary circumscribing an area surrounded by the area to be mowed.

In other aspects of this disclosure, an autonomous mowing robot comprises a robot body carrying a grass cutter, a drive system including a motorized wheel supporting the robot body, a controller operably coupled to the motorized wheel for maneuvering the mowing robot to traverse a bounded lawn area while cutting grass. The controller is configured to: in a teaching mode, store in non-transient memory a set of geospatially referenced boundary data corresponding to positions of the mowing robot as the mowing robot is guided about a border of the lawn area, in the teaching mode, store reference data corresponding to a reference position within the lawn area, remove from the set of boundary data one or more data points corresponding to positions spatially closer to the reference position than another adjacent position represented by another data point of the set of boundary data, thereby creating a redacted boundary data set, and then, in an autonomous operating mode, control the mowing robot to autonomously mow an area bounded by a path corresponding to the redacted boundary data set, including altering direction of the mowing robot at or near a position corresponding to data in the redacted data set so as to redirect the robot back into the bounded area.

Implementations can include an emitter/receiver carried on the robot body and configured to communicate with perimeter markers bounding the lawn area in the teaching mode. A removable handle securable to the robot body and graspable by an operator to manually guide the mowing robot about the border of the lawn area in the teaching mode. The robot is configured to detect if the handle is attached to the robot body. The controller is configured to initiate the teaching mode in response to detecting that the handle is attached. The handle comprises a kill switch in communication with the drive system, the kill switch configured to send a signal to turn off the mowing robot when the kill switch is not activated.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
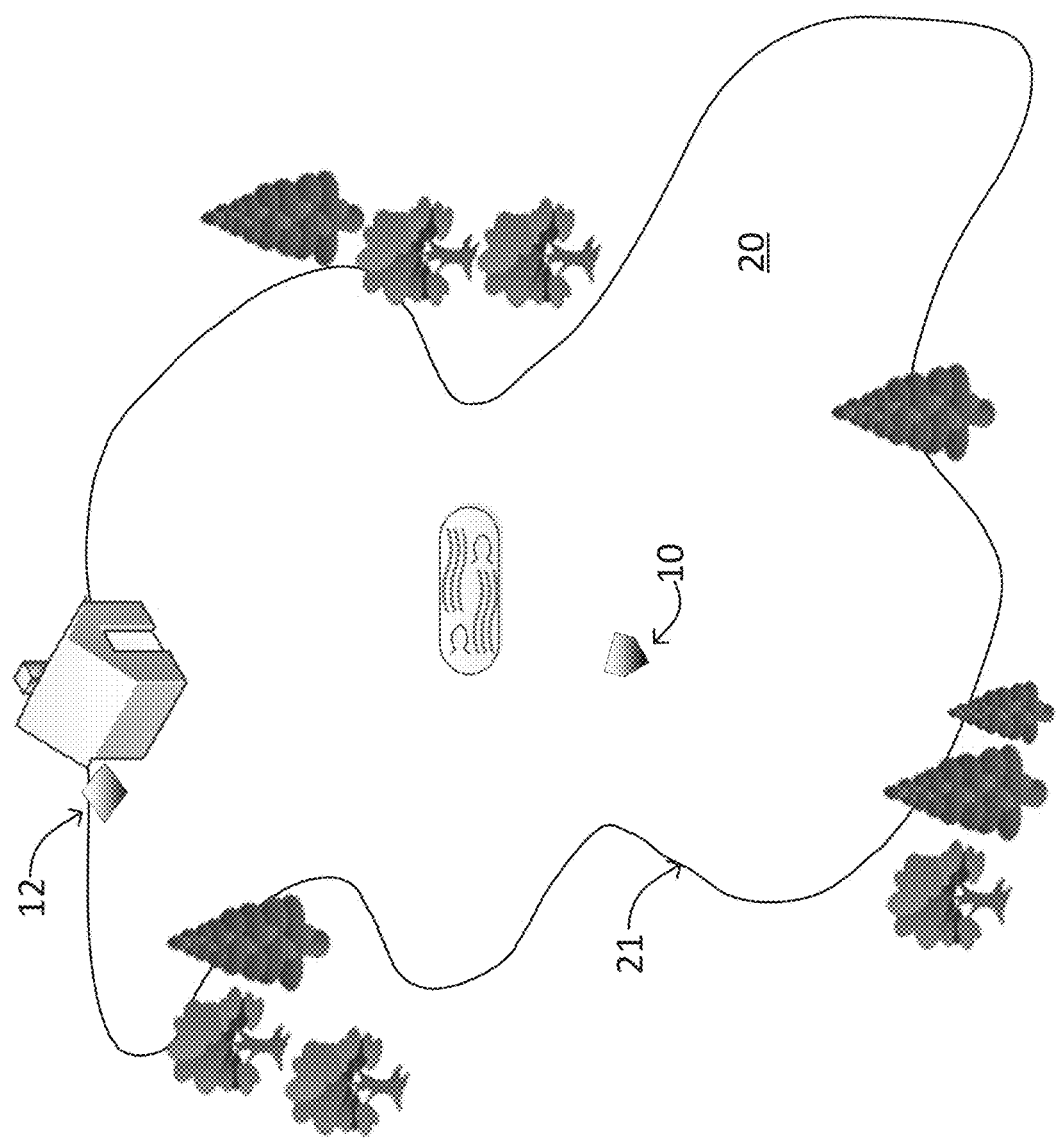
FIG. 1A is a schematic view of an autonomous mobile mowing robot placed on a lawn to be mowed.
Figure 1B:
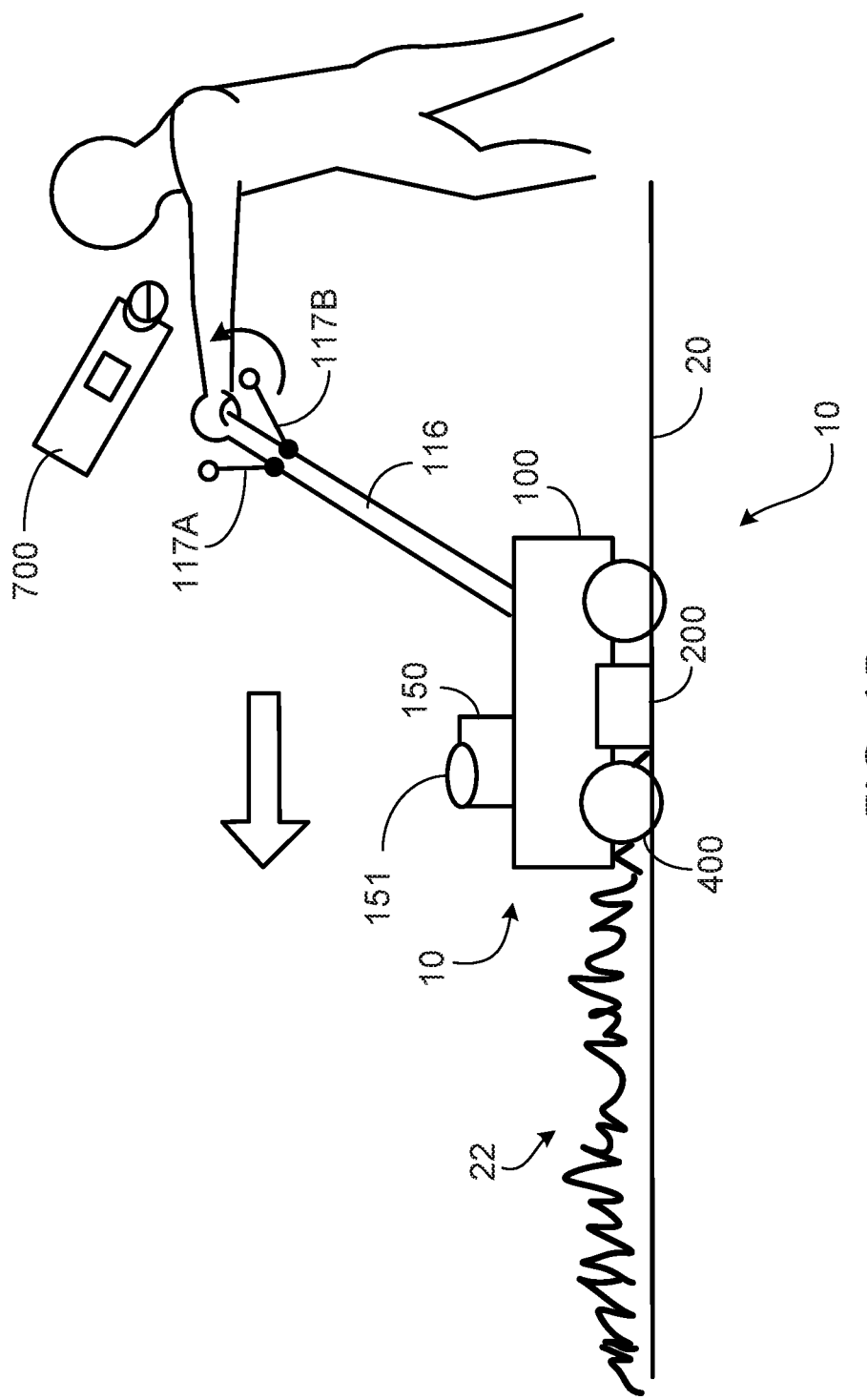
FIG. 1B is a schematic view illustrating a human operator navigating the lawn's perimeter with an autonomous mobile mowing robot.
Figure 1C:
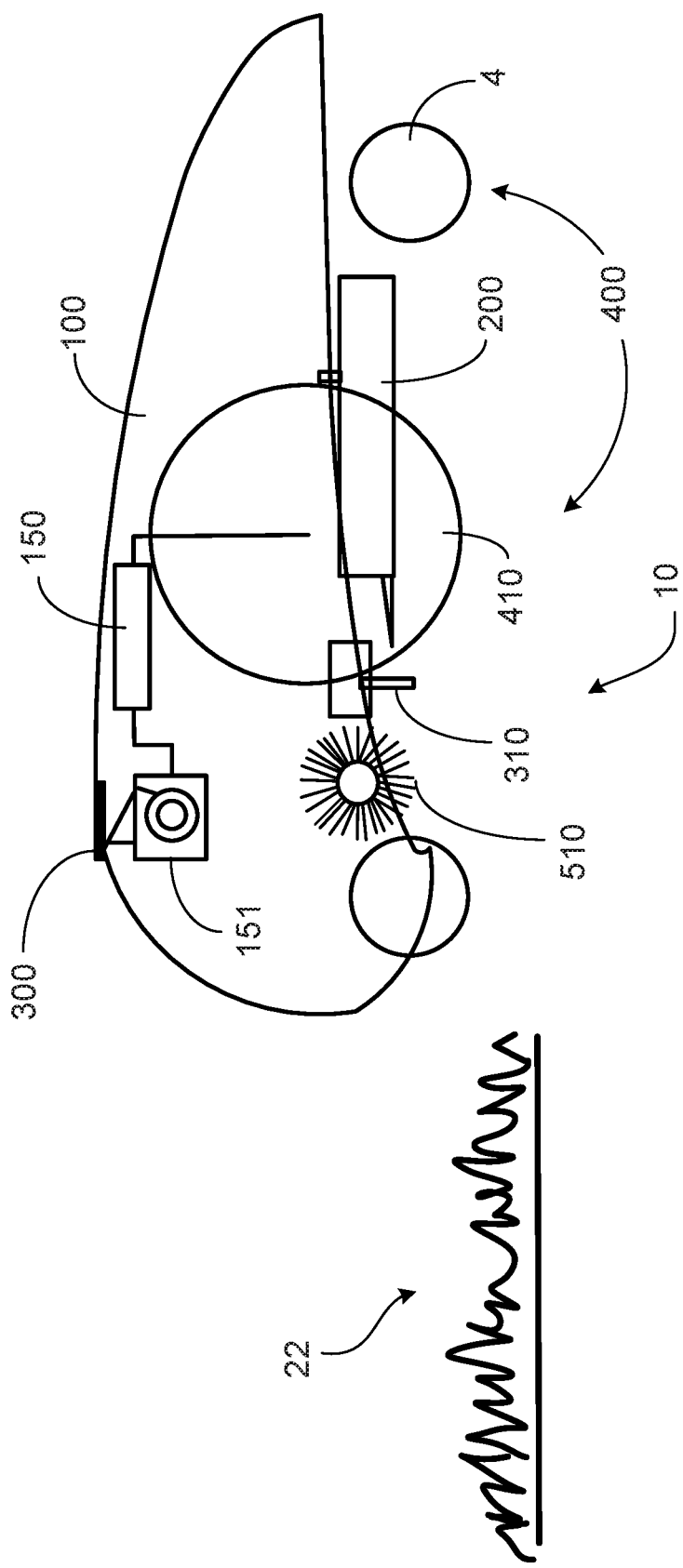
FIG. 1C is a schematic view illustrating an autonomous mobile mowing robot navigating a lawn autonomously.

Referring to FIGS. 1A-1C, an autonomous robot lawnmower 10 is configured to mow a lawn 20. The autonomous robot lawnmower 10 moves about the lawn 20 and cuts grass 22 as it is traversing the lawn 20. The robot lawnmower 10 includes a body 100, a surface treater 200 secured to the body 100, a drive system 400 including at least one motorized wheel 410, and a sensor system 300 having at least one surface sensor 310 carried by the body 100 and responsive to at least one surface characteristic. The drive system 400 is carried by the body 100 and configured to maneuver the robot lawnmower 10 across lawn 20 while following at least one surface characteristic. In this example, surface treater 200 includes a reciprocating symmetrical grass cutter floating on a following wheel 410. In some examples the wheel can be a continuous track, or tank tread. In other examples, surface treater 200 may comprise a rotary cutter, a spreader, or a gatherer. A grass comber 510 may also be carried by the body 100. The robot body 100 supports a power source 106 (e.g., a battery) for powering any electrical components of the robot lawnmower 10, including the drive system 400. A wireless operator feedback unit 700 sends a signal to an emitter/receiver 151 on the robot lawnmower 10 that is in communication with a controller 150. The drive system 400 is configured to follow the signal received from the operator feedback unit 700. The robot lawnmower 10 may be docked at a base station or dock 12. In some examples, the dock 12 includes a charging system for changing a battery 160 housed by the robot body 100.

An important step in the use of the robot lawnmower 10 is defining a perimeter 21 of the lawn 20 to be mowed. In some implementations, as a safety measure autonomous use of the robot lawnmower 10 can only be executed once a perimeter or boundary has been determined and stored in non-transitory memory of the robot lawnmower 10. In some implementations, a human operator manually defines a perimeter 21 by pushing the robot 10 using a handle 116 attached to the robot body 100, as shown in FIG. 1B. Once the perimeter has been taught, the robot can navigate the lawn/area to be cut without further human intervention.

Referring to FIG. 1B, in a perimeter teaching mode, a human operator manually guides the robot lawnmower 10 to establish the perimeter 21 of the lawn 20. Determining the perimeter 21 can include guiding the robot lawnmower 10 with a push bar or handle 116 attached to the body 100. The push bar 116 may be detachable from or stowable on the robot body 100. In some cases, the push bar 116 includes a switch, speed setting, or joystick to advance and steer the robot lawnmower 10. In one instance, the push bar 116 includes one or more pressure or strain sensors, monitored by the robot lawnmower 10 to move or steer in a direction of pressure (e.g., two sensors monitoring left-right pressure or bar displacement to turn the robot lawnmower 10). In another instance, the push bar 116 includes a dead man or kill switch 117A in communication with the drive system 400 to turn off the robot lawnmower 10. The switch 117A may be configured as a dead man switch to turn off the robot lawnmower 10 when an operator of the push bar 116 ceases to use, or no longer maintains contact with, the push bar 116. The switch 117A may be configured act as a kill switch when the push bar 116 is stowed, allowing a user to turn off the robot lawnmower 10. The dead man or kill switch 117A may include a capacitive sensor or a lever bar. In another instance, the push bar 116 includes a clutch 117B to engage/disengage the drive system 400. The robot lawnmower 10 may be capable of operating at a faster speed while manually operated by the push bar 116. For example, the robot lawnmower 10 may operate at an autonomous speed of about 0.5 m/sec and a manual speed greeter than 0.5 m/sec (including a "turbo" speed actuatable to 120-150% of normal speed). In some examples, the push bar 116 may be foldable or detachable during the robot's autonomous lawn mowing. Alternatively, the push bar 116 can be configured as one of a pull bar, pull leash, rigid handle, or foldable handle. In some embodiments, the push bar 116 can be stowed on or in the robot body 100.

As noted above, prior to autonomously mowing the lawn, the robot lawnmower 10 completes a teaching phase. During the perimeter teaching phase, the human operator may pilot the robot lawnmower 10 in a manner that requires correction, thus putting the robot lawnmower 10 in an unteachable state. When the robot lawnmower 10 detects that it is in an unteachable state during a teach run, the robot lawnmower 10 alerts the operator (e.g., via operator feedback unit 700 such as a display on a mobile device or a display integrated in a handle 116) to change a direction or speed of the robot lawnmower 10 to enable the robot lawnmower 10 to continue to record the perimeter 21 and/or return to traveling on traversable terrain. For instance, the robot lawnmower 10 may enter the unteachable state when the operator pushes the robot lawnmower 10 into an area of the lawn 20 where the robot lawnmower 10 loses ability to determine its location, when the user is on a second teaching path that varies from a first teaching path, or when the user pushes the robot lawnmower 10 too fast or over terrain that is too bumpy or tilted.

For example, the operator may try to push the robot lawnmower 10 between a divot and a rock, causing the robot lawnmower 10 to tilt at an excessive angle (e.g., over 30 degrees). Or the operator may attempt to teach the robot lawnmower 10 a path that goes through topography that the robot lawnmower 10 cannot traverse in the autonomous mode. In such cases, the robot lawnmower 10 alerts the operator (e.g., via the operator feedback unit 700) to select a different path. As previously described, the robot lawnmower 10 may alert the operator via the operator feedback unit 700 by a visual signal on a display, an audible signal through a speaker, and/or a tactile signal, such a vibration from a vibrational unit of the operator feedback unit 700.

If the operator is pushing the robot lawnmower 10 too fast or too slow during the teaching mode, thus placing the robot in the unteachable state, the robot lawnmower 10 prompts the user to either increase or decrease the speed of the robot lawnmower 10. In some examples, operator feedback unit 700 includes a speed indicator that will light or flash (green, yellow, red light) when the robot lawnmower 10 is going at a speed greater or lower than a threshold speed.

As will be discussed below in reference to FIG. 2A, boundary markers 805 may be placed along the perimeter of the lawn 20 to aid localization of the robot lawnmower 10. In some cases, boundary markers 805 send out a signal that the robot lawnmower interprets to determine its position relative to the boundary marker. In other examples, boundary markers 805 are passive. In either case, when the robot lawnmower 10 loses contact with the boundary markers 805, the robot lawnmower 10 may alert the user to change paths to remain within the confinement of the boundary markers 805.

In some examples, the teaching routine requires the operator to traverse the perimeter 21 of the lawn 20 a second time (or more). Once the operator completes a first teaching run, completing a closed loop about the perimeter of the area to be mowed, the robot lawnmower 10 may alert the operator that a second run is needed. In one example, the operator hits a STOP button to affirmatively indicate completion of a teaching run around the perimeter 21 of the lawn 20. In some examples, the robot lawnmower 10 allows the operator to either complete the second teaching run right after the first teaching run or wait until later. If the operator completes a second or subsequent teaching run and the robot lawnmower detects a variance between the two determined perimeters that is greater than a threshold variance, the robot lawnmower 10 alerts the user to the apparent discrepancy and prompts another teaching run to learn the perimeter 21 of the lawn 20.

When the perimeter-teaching process is complete, the user may dock the robot lawnmower 10 in its dock 12 (see FIG. 1A), allowing the robot lawnmower 10 to recharge before mowing.

Figure 2A:
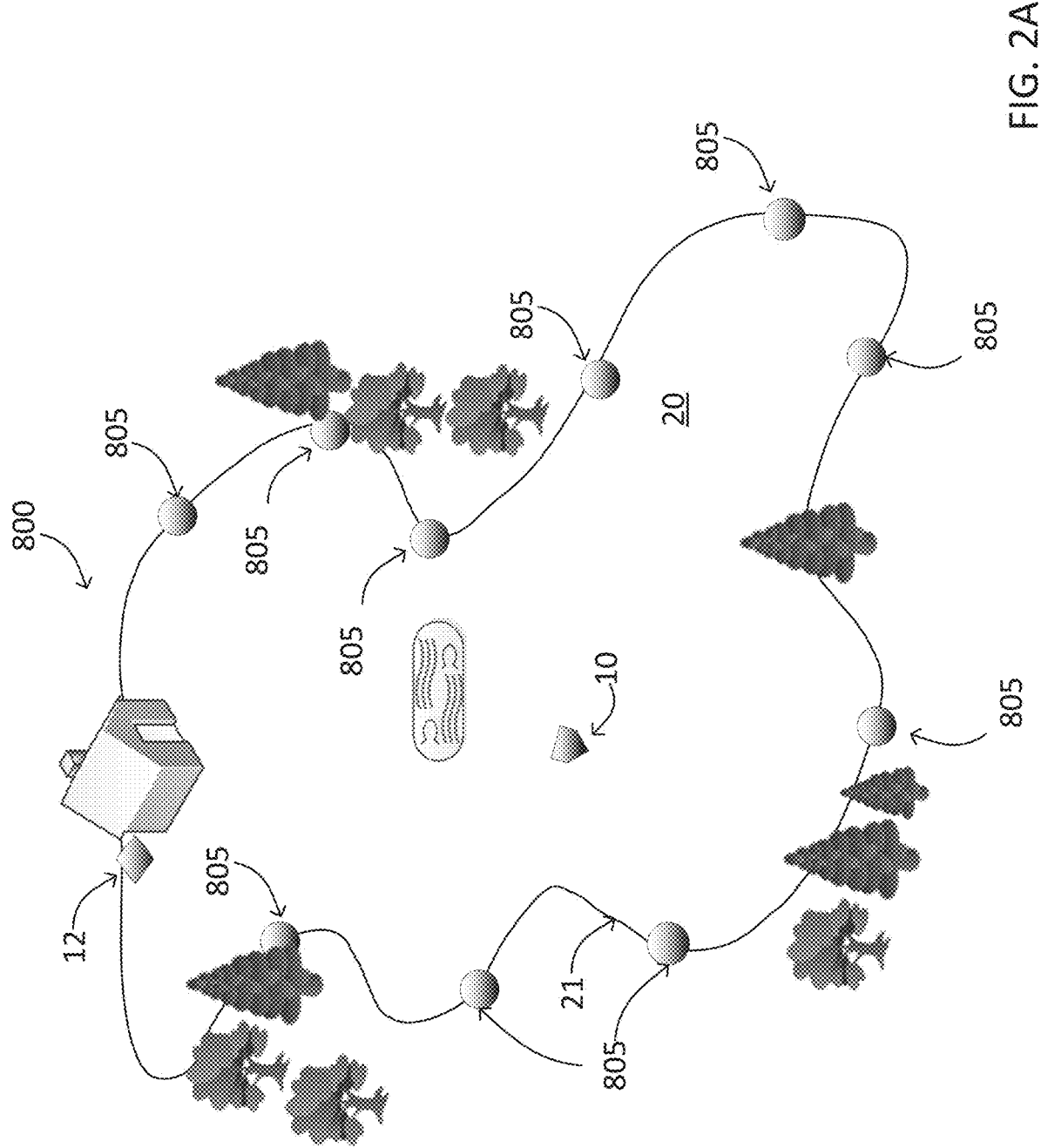
FIG. 2A is a schematic top view image of a lawn with boundary markers.

In some implementations, the robot lawnmower 10 includes a boundary detection system 800 that includes the emitter/receiver 151 disposed on the robot body 100 and passive boundary markers 805 (FIG. 2A). The types of passive boundary markers 805 may include: LIDAR scan match, passive LIDAR retro-reflectors (beacons) or both of those together. In some examples, the boundary markers 805 include: RADAR scan matching (blips), RADAR retro-reflectors or both. In implementations including boundary markers 805 placed along the perimeter 21 of the lawn 20, the boundary markers 805 are individually identifiable by adjacent scan match data performed by the emitter/receiver 151 (see FIG. 1B). In scan matching, the robot lawnmower 10 can match scans taken at a given time while driving with scans stored in memory that are characteristic of each boundary marker 805, and the robot lawnmower 10 is thus able to determine its position relative to each of the individually identifiable boundary markers 805. In some implementations, the boundary markers 805 includes other individual identification means perceptible to the robot lawnmower 10, such as a bar code or encoded signal to enable the robot lawnmower 10 to determine its relative position.

As shown in FIG. 2A, boundary markers 805 (e.g., beacons) are placed around the perimeter of the lawn 20 to constrain or influence behavior of the robot lawnmower 10. In some implementations, the boundary markers 805 create a virtual wall that constrains the robot lawnmower 10 from going outside the marked boundary (i.e., perimeter 21). A user places the boundary markers 805 at desired positions along the perimeter 21. To create the virtual wall, the boundary markers 805 are each within a line of sight of an adjacent boundary marker 805. The boundary markers 805 may include a home marker that an operator can place in a position indicating a global origin (e.g., dock 12 or two boundary markers placed side by side). The operator distributes the boundary markers 805 as evenly as possible along the perimeter 21 of the lawn 20 to indicate the confinement area. Preferably each major corner of perimeter 21 is marked by a boundary marker 805.

Figure 2B:
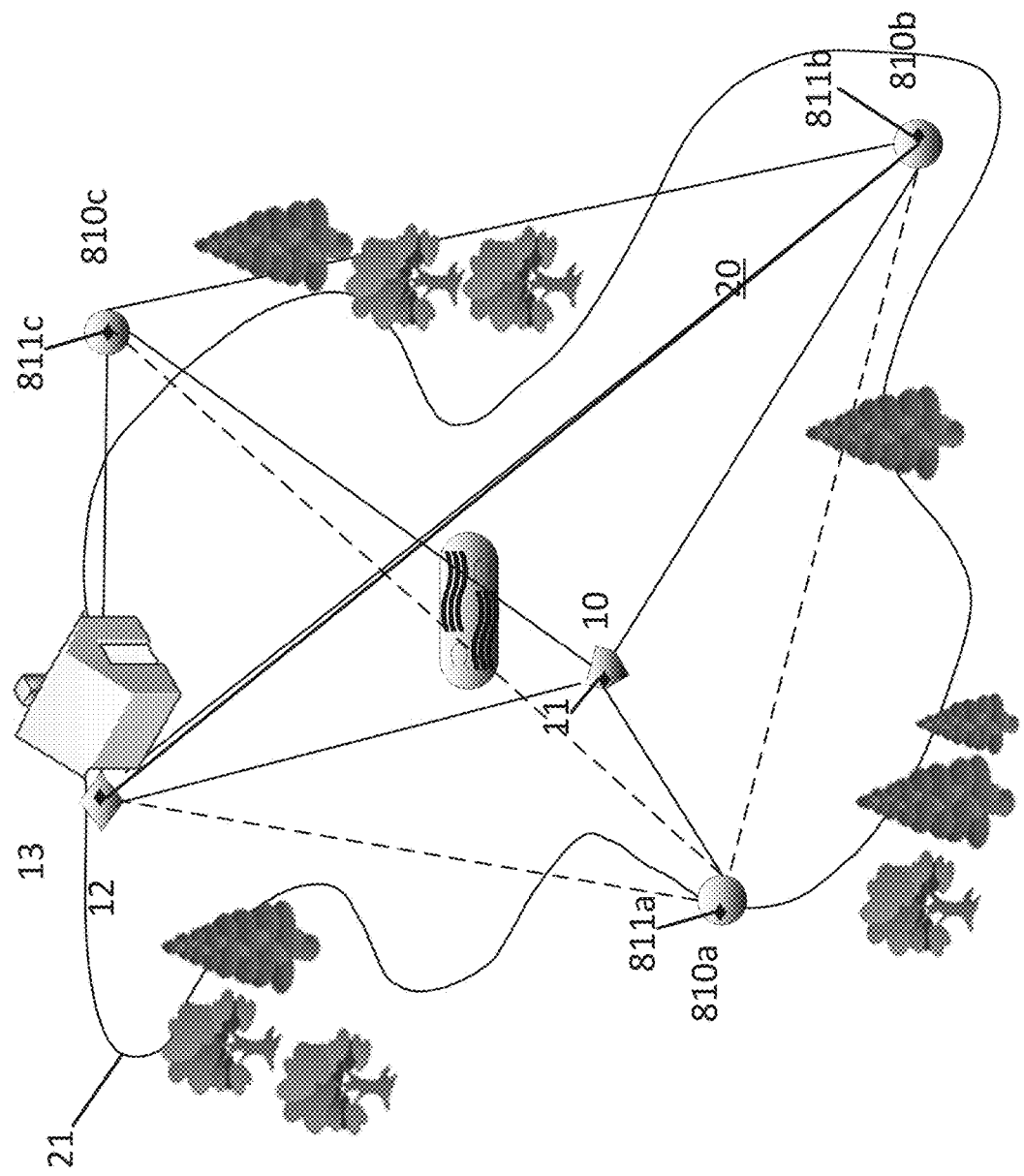
FIG. 2B is a schematic top view image of a lawn with UWB beacons showing communication between each beacon, a dock, and the robot.

Alternately, landmarks such as Ultra-wide Band (UWB) beacons can be placed in the environment, and the robot can use the landmarks to localize its position. These beacons can be placed inside the mowable area (e.g., beacon 810b), on the boundary (e.g., beacon 810a), or outside the boundary (e.g., beacon 810c). These beacons 810 (FIG. 2B) include UWB transceivers 811 that communicate with each other as well as with a UWB transceiver 11 located on the lawnmower robot 10. Respective UWB transceivers are placed on the robot lawnmower 10 (e.g., the robot lawnmower 10 includes a receiver/emitter 151 communicating with each of the beacons 810a-c), each of the beacons 810a-c, and optionally the dock 12. Several beacons 810a-c are placed about a mowable area and are spaced apart from each other and from the dock 12. As shown by the solid lines emanating from the robot lawnmower 10 in FIG. 2B, the robot lawnmower 10 communicates with each of the beacons 810a-c and the dock 12. Each beacon 810a-c communicates with each of the other beacons and the dock 12.

In general, ultra-wideband (also known as UWB, ultra-wide band and ultraband) is a radio technology which operates at a low energy level for short-range, high-bandwidth communications. Ultra-wideband transmits information spread over a large bandwidth (>500 MHz). In some examples, UWB includes transmission from an antenna for which the emitted signal bandwidth exceeds the lesser of 500 MHz or 20% of the center frequency. The use of UWB beacons 810a-c (which include the UWB transceivers 811a-c) provides several advantages over other confinement/localization systems. In general, ultra-wideband characteristics are well-suited to short-distance applications. Use of ultra-wideband can be beneficial in autonomous lawn mowing because the signals can be transmitted past/through obstacles such as bushes or trees and provide precision localization of the lawn mowing robot 10 relative to the UWB beacons 810a-c. UWB transceivers 811a-c emit an omnidirectional signal so the use of UWB signals can be more resistant to robot orientation than line-of-sight optical systems, such as vision-based or laser-based systems. Additionally, a UWB signal can pass through small obstacles such as trees and shrubs allowing placement of the UWB beacons in less visible locations about a mowable space (e.g., as shown by the transmission between beacon 810b and 810c).

Figure 3:
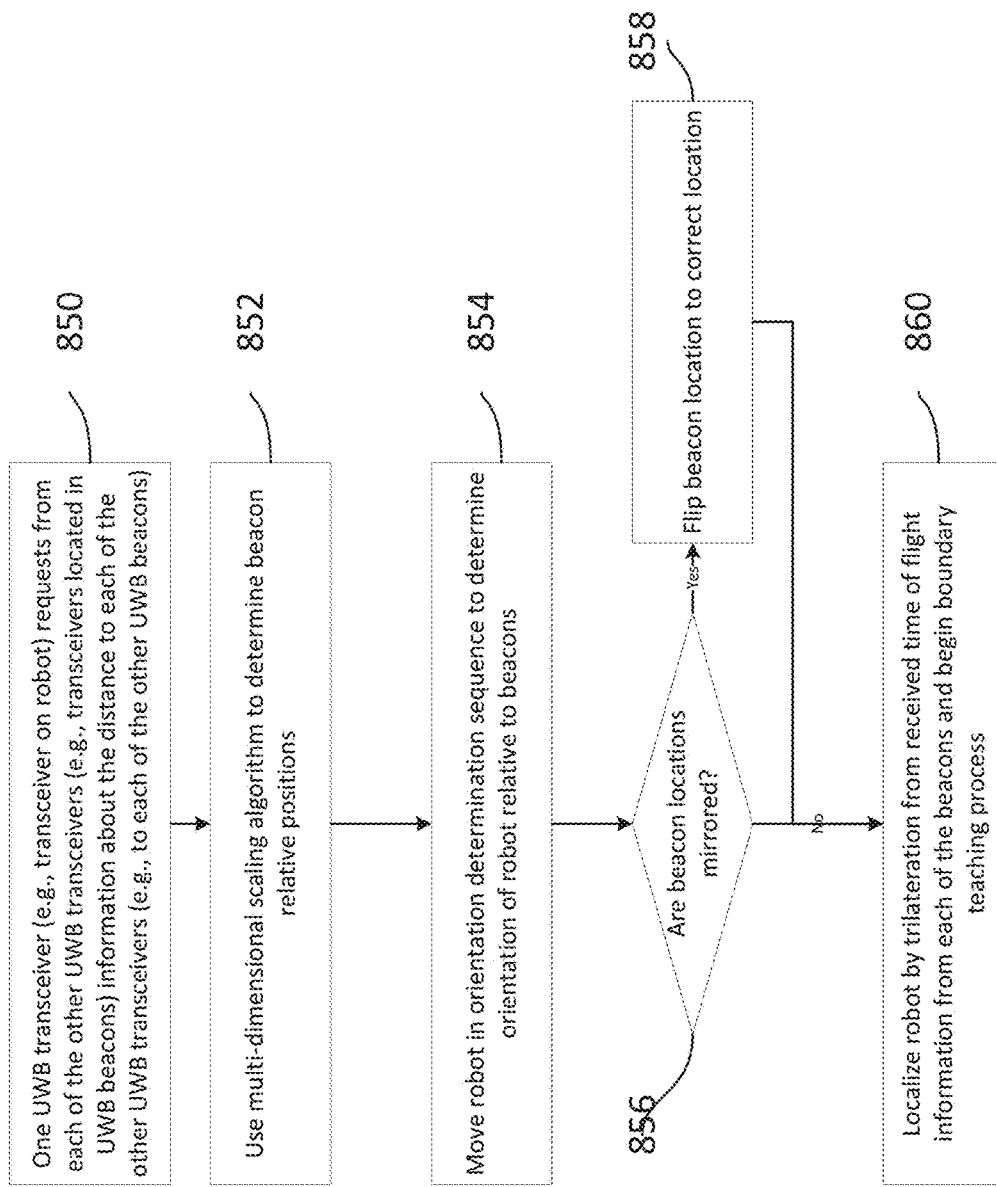
FIG. 3 is a flow chart of a process for initializing and establishing the position of UWB beacons around a lawn.

If UWB signals from UWB beacons 810a-c positioned about a yard are to be used to determine the autonomous lawn mowing robot's location within the yard, the location of the UWB beacons 810a-c needs to be established. In general, as described below in more detail in relation to FIG. 3, upon initial setup of a UWB system, an initialization process is performed. The process is based, in part, on a multidimensional scaling algorithm used to determine the location of the UWB beacons 810a-c relative to one another, which in turn can be used to establish the location of the robot 10 relative to the beacons. Thus, a home owner or other person installing the UWB beacons 810a-c is not required to place the UWB beacons 810a-c at particular locations because the system automatically determines the locations of the UWB beacons 810a-c upon initialization. This flexibility in positioning of the UWB beacons 810a-c is believed to provide the advantage of simplifying the installation and setup procedure for the autonomous lawn mowing robot system. Additionally, due to the omni-directional nature of the signal, the UWB beacons 810a-c can be lower to the ground than in certain line-of-sight based systems because the robot 10 does not need to align (e.g., in a line-of-sight arrangement) with the beacon in order for a signal to be received from the beacon. Upon subsequent use (e.g., prior to each time the autonomous lawn mowing robot mows the lawn), a calibration or confirmation process can be performed to confirm that the UWB beacons 810a-c are still in their expected, previously determined locations.

Figure 4A:
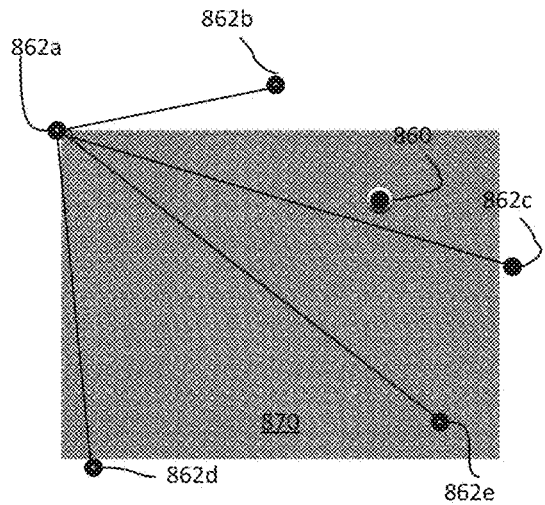
FIGS. 4A-F are schematic drawings illustrating a UWB beacon based lawn mowing system initialization process, FIGS. 5A-5D provide a schematic drawing illustrating a process for estimating the location of a sensor.

Referring to FIGS. 3 and 4A-F, a UWB beacon based lawn mowing system initialization process begins with a plurality of UWB beacons 862a-e that each include a UWB transceiver placed around a mowable space 870 (FIG. 4A). The UWB transceivers each have a unique identifier included in transmissions from the UWB transceiver to identify the source of the transmission. Additionally, the robot lawnmower 860 includes a UWB transceiver which allows the robot lawnmower 860 to communicate with the UWB transceivers in the UWB beacons 862a-e. The UWB beacons 862a-e placed around a mowable space 870 are generally non-mobile and are intended to remain stationary once placed around the mowable space 870. The UWB beacons can be positioned inside the mowable space 870, outside the mowable space 870, and/or on the border between the two. Additionally, due to the omnidirectional nature of the signals generated by the UWB transceivers in the UWB beacons 862a-e, the robot can be placed inside or outside of the boundary at startup.

Figure 4B:
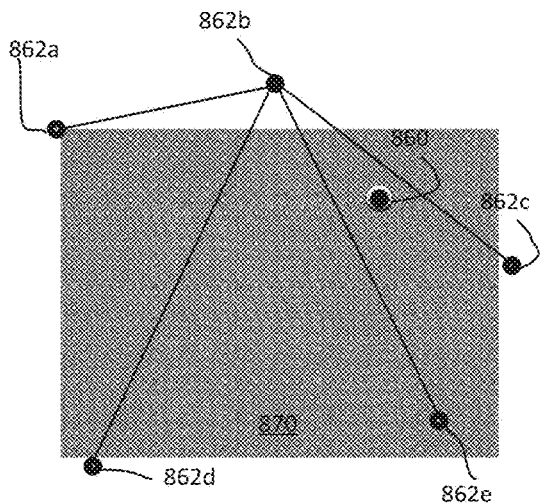
Figure 4C:
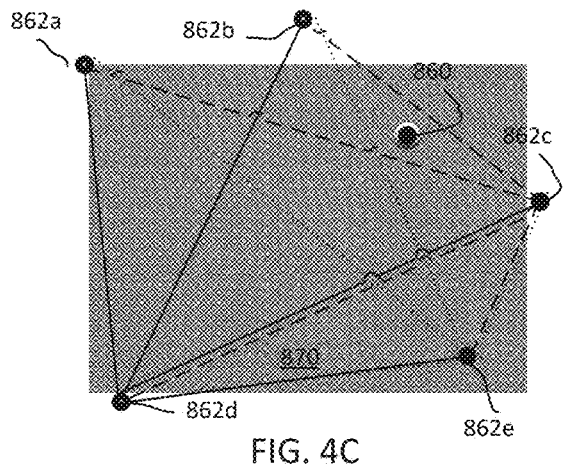

The initialization process includes gathering/obtaining information about the distances between the UWB beacons positioned around the mowable space (step 850). More particularly, one UWB transceiver (e.g., the transceiver located on the robot 860 or on the dock) sends a request to each of the other UWB transceivers for information about the distance between itself and each of the other UWB transceivers. This information can include time-of-flight information or other data that can be used to determine distance. For example, in the examples shown in FIGS. 4A-4D, upon receiving the request from the UWB transceiver on the robot 860, the UWB transceiver in UWB beacon 862a sends a signal to the UWB transceivers in UWB beacons 862b, 862c, 862d and 862e. In response, the UWB transceiver in beacon 862a receives, from the UWB transceivers in UWB beacons 862b, 862c, 862d and 862e, time-of-flight information and the associated unique identifier for the UWB transceiver (FIG. 4A). Similarly, upon receiving the request from the UWB transceiver on the robot 860, the UWB transceiver in beacon 862b sends a signal to the UWB transceivers in UWB beacons 862a, 862c, 862d and 862e. In response, the UWB transceiver in beacon 862b receives, from the UWB transceivers in UWB beacons 862a, 862c, 862d and 862e, time-of-flight information and the unique identifier for the associated UWB transceiver (FIG. 4B). Similar gathering of information occurs for beacons 862c, 862d, and 862e (FIG. 4C). This information is sent from the individual UWB transceivers to the UWB transceiver that issued the request for information (e.g., the transceiver located on the robot 860 or on the dock).

Figure 4D:
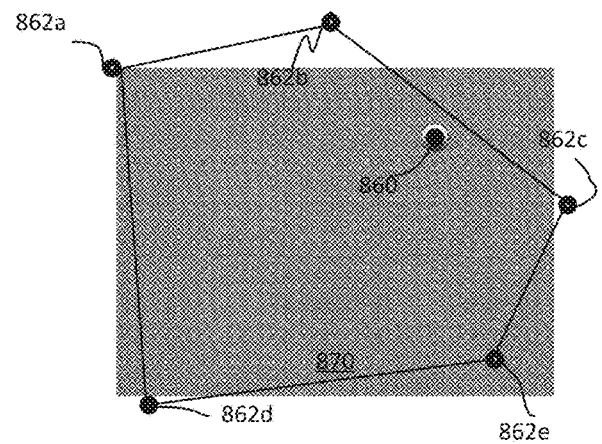
Figure 4E:
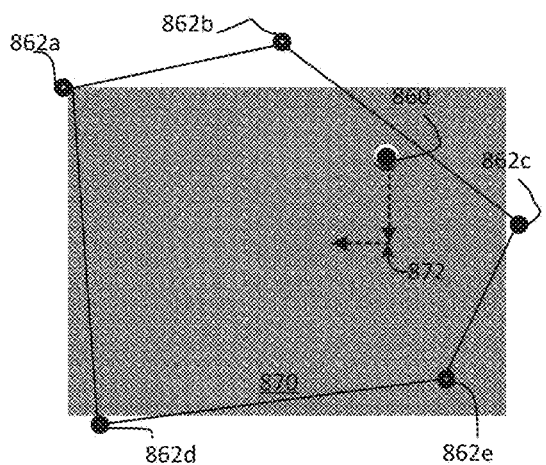

After receiving the information about the relative distances between the UWB transmitters in each of the UWB beacons, a processor in the robot lawnmower 10 (or a remotely located processor) uses a multi-dimensional scaling algorithm to determine the relative position (e.g., the x-y position relative to a global origin such as the dock position) of the UWB beacons (852, FIG. 4D). In general, multidimensional scaling (MDS) is a way of visualizing the level of similarity of individual cases of a dataset. It refers to a set of related ordination techniques used in information visualization, in particular to display the information contained in a distance matrix. An MDS algorithm aims to place each object in N-dimensional space such that the between-object distances are preserved as well as possible. Each object is then assigned coordinates in each of the N dimensions. The relative positions of the UWB beacons (e.g., beacons 862a, 862b, 862c, 862d and 862e) determined using the MDS algorithm are stored in a memory.

In some examples, the use of a multi-dimensional scaling (MDS) algorithm can generate a beacon map that is a mirror image of the actual beacon layout. If a mirror image of the actual beacon layout were used during navigation, this would result in the robot not turning in the intended direction when trying to face another point in space. To test for a mirror image layout, the autonomous lawn mowing robot 860 is moved in an orientation determination sequence (step 854). The system then determines whether the UWB beacon locations are mirrored (step 856) and if so, reassigns headings to the UWB beacon locations to correct the orientation (step 858). More particularly, after performing the initial beacon setup and localization, the robot stores its initial point and drives forward for a short distance (e.g., 15-30 cm) to a second point. This driving forward establishes a y-axis used to reassign beacon locations if the beacon map is determined to be a mirror image of the actual beacon layout. Then the robot turns roughly 90 degrees to the left and drives forward another short distance (e.g., 15-30 cm) as shown in path 872 in FIG. 4E. The processor then computes the difference in bearing between the vector connecting the initial point to the second point and the vector connecting the second point to the third point. If the beacon locations are correct, this value will be close to 90 degrees. If the beacon locations are mirrored, the value will be close to minus 90 degrees, and the robot will reassign/reinterpret (e.g., flip) the beacon coordinates across the y-axis and thereby properly determine its pose. A similar procedure can be used with the robot turning to the right.

Figure 4F:
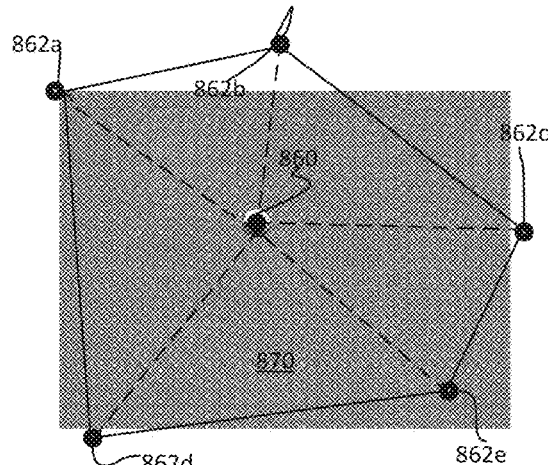

After the UWB beacon locations are determined and stored, the system localizes the autonomous lawn mowing robot 860 by trilaterating based on received time-of-flight information (range) from each of the UWB transceivers (FIG. 4F). In general, trilateration is the process of determining absolute or relative locations of points by measurement of distances, using the geometry of circles, spheres or triangles. In particular, the location of a sensor can be determined by measuring the range to at least three landmarks, drawing a circle of the corresponding radius around each landmark, and determining the point at which these range circles intersect. With perfect sensing, all of the circles would intersect at one point, and this location could be determined using a closed-form solution. However, all sensors have some noise, so these circles are unlikely to intersect at one point, and some means is necessary to estimate the sensor position based on multiple intersections between range circles.

In one example, a least squares algorithm can be used to minimize the sum of squared error between the sensed ranges and the position estimate.

In another example, as shown in FIG. 5, the robot's location can be determined using a technique referred to herein as minimum-distance intersection set trilateration (MIST). MIST is a technique for estimating the location of a sensor based on noisy range data from a set of fixed beacons at known locations. Like other trilateration techniques, MIST uses the intersections between circles corresponding to range readings to determine the location of the sensor.

Using the MIST technique, the time-of-flight measurements are used to determine a circle of possible locations around each of the beacons where the radius of the circle is based on the distance between the UWB transceiver in the UWB beacon and the UWB transceiver in the robot. For every pair of range circles, there may be zero, one, or two intersection points.

MIST works by examining all of the feasible sets of intersection points and selecting the set with the minimum total distance between points. A feasible set consists of a candidate point for each pair of range circles. There are three possible cases for each pair of circles.

Figure 5A:
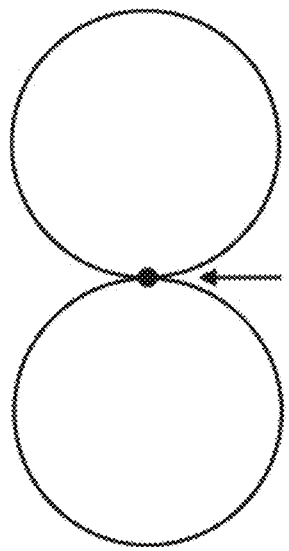

As shown in FIG. 5A, in one case the circles do not intersect. In this case, the candidate point is set to the midpoint in the line connecting the closest points on the two range circles.

Figure 5B:
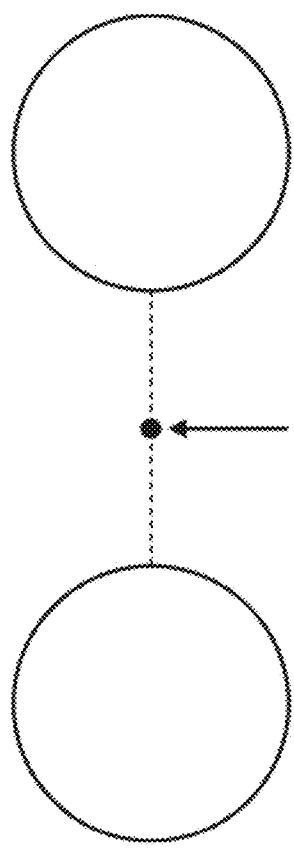

As shown in FIG. 5B, in another case the circles intersect at one point. In this case, the candidate point is set to the single intersection point.

Figure 5C:
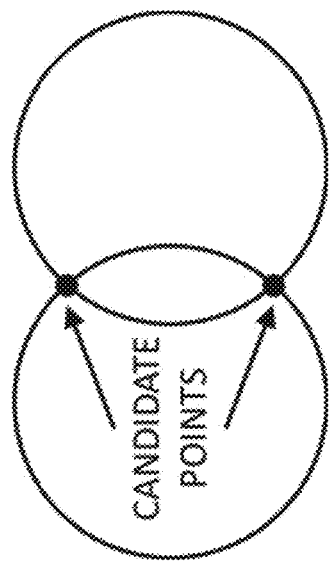
Figure 5D:
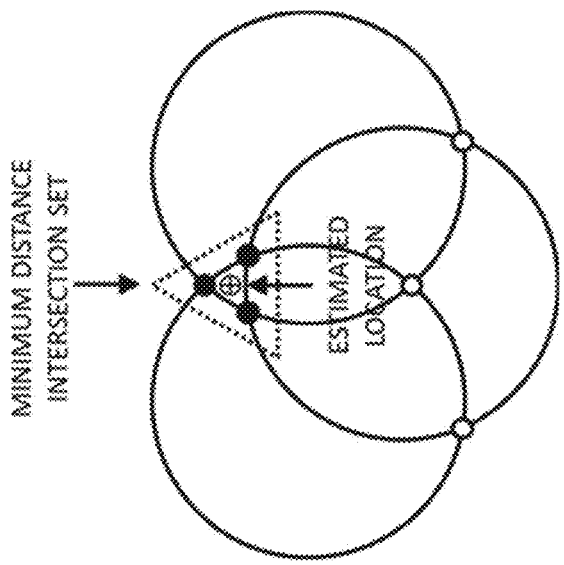

As shown in FIGS. 5C and 5D, in another case the circles intersect at two points. In this case, the candidate point is set to one of the two intersection points. Since each pair of range circles may generate up to two candidate points, the computational complexity of this algorithm is exponential in the number of beacons. However, if the number of beacons is small, the algorithm remains computationally tractable. After selecting the feasible set of intersection points (e.g., 3 locations, 5 locations) with minimum total inter-point distance, MIST estimates the sensor position to be the centroid of the candidate points within this set. For example, as shown in FIG. 5D, the small circles mark candidate points (e.g., the intersection locations for pairs of circles). The filled circles are the candidate points in the feasible set with the minimum total inter-point distance. The unfilled circles are the candidate points that are not in this set. The crosshairs mark the centroid of the points in the minimum distance intersection set and correspond to the estimated location of the sensor.

In some examples, one or more of the UWB beacons may be in an isolated location and therefore it may be challenging to locate the UWB beacon relative to the other UWB beacons. For example, one beacon could be placed in a side-yard where the house prohibits communication with some of the other UWB beacons. As such, the initially determined location for the beacon may have a lower confidence since the location determination is based on communications between the isolated beacon and only a subset of the other beacons positioned about the yard. If a calculated confidence value is below a threshold confidence value, the system could request that the user move the mower (which itself includes a UWB transceiver) to a location where the mower can communicate with both the isolated beacon and a plurality of other beacons. The system can then use the UWB transceiver on the robot to help position the isolated UWB beacon (e.g., using a similar process to that described above). Once the isolated UWB beacon's revised location has been determined, the autonomous robot can be moved and the isolated beacon's location can be stored relative to the other beacons.

Figure 6A:
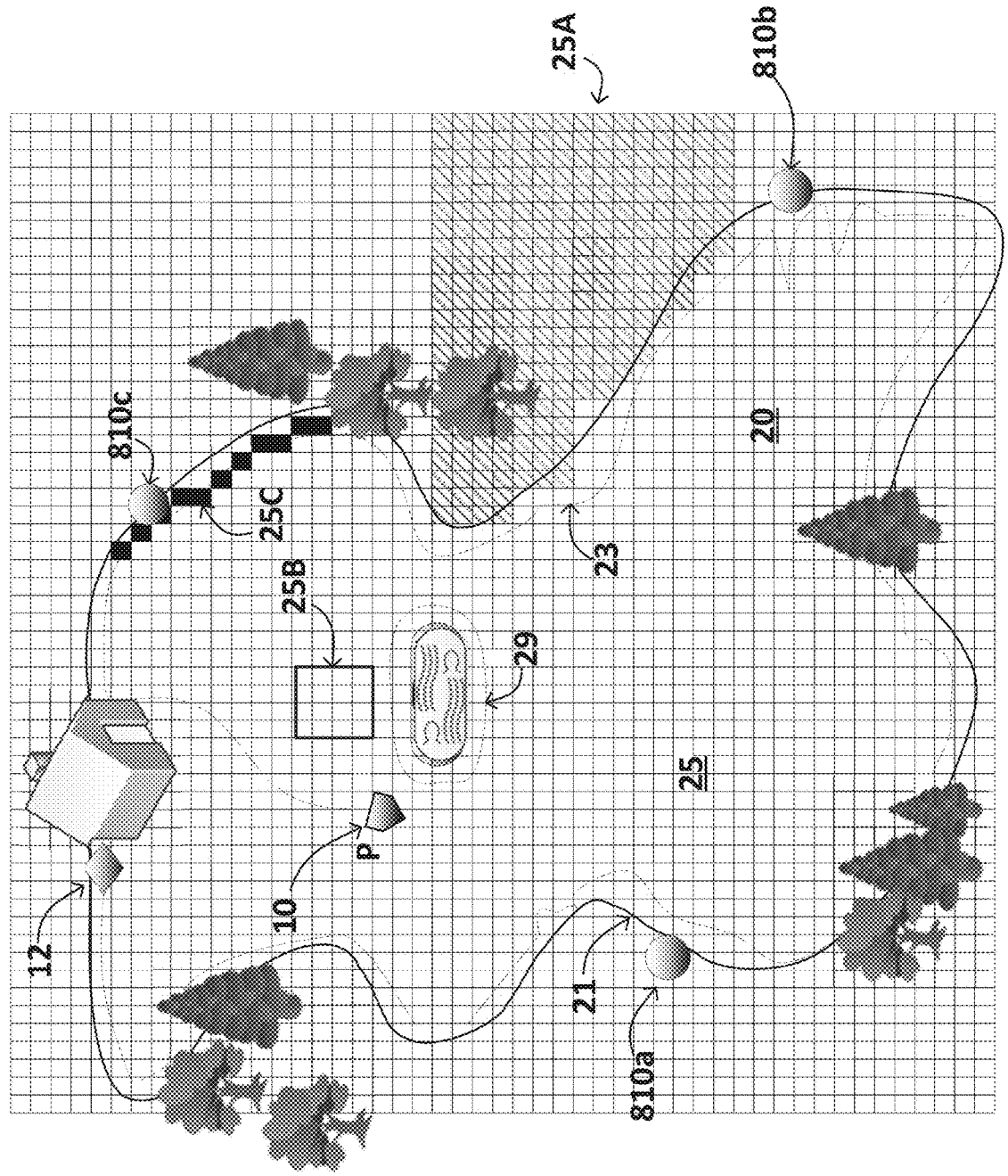
FIG. 6A is a schematic of a non-smooth path generated based on a path traversed by a human operator along the perimeter of a lawn and around an interior boundary inside the lawn.

Referring to FIG. 6A, after setting up the UWB beacons the human operator will walk the robot around the lawn 20. During this teaching mode, the human operator may experience difficulty manually navigating the robot lawnmower 10 around the perimeter 21 due to e.g., bumpy terrain or an obstacle blocking the path of the robot lawnmower 10. In some cases, to avoid placing the robot lawnmower 10 in an unteachable state and/or to navigate the robot lawnmower 10 around challenging obstacles or sharp turns the user may generate non-smooth paths. For example, a user may perform jagged or staggered movements in order to navigate about the perimeter 21 during guidance of the robot lawnmower 10. Thus, the initially established lawn outline (e.g., the actual teaching path 23 traversed by the robot) does not correspond in some location to the edge of mowable area.

In order to establish the boundary of the mowable area, an algorithm will select the positions navigated by the robot lawnmower 10 during teaching mode. Once the rough lawn boundary is determined, the algorithm will perform edge selection and smoothing functions on the initial boundary data (or on a subset of the collected data). The edge selection function finds the outermost edge of the mowable area, maximizing the area to be mowed, and combined with the smoothing function results in a continuous boundary that the robot lawnmower 10 can navigate autonomously subsequent to the teaching mode. This process for determining and smoothing the boundary of the mowable space can be used with various beacon-based localization systems where distance is measured from the mobile asset (robot) to the beacons. Such technologies include but are not limited to time-of-flight (TOF), time distance of arrival (TDOA), or signal strength based systems.

During the teaching mode a user will attempt to navigate the robot around perimeter 21 of the lawn 20, illustrated by the solid boundary line, but in fact navigate along the actual teaching path 23 (illustrated by the dashed boundary line) which may be non-smooth, and can include irregularities. During the teaching mode the robot lawnmower 10 will determine and store its position at all times relative to the beacons 810, via a data processing unit. This data processing unit may be the controller 150 mounted on the robot lawnmower (see FIG. 1B), or may be a separate data processing unit. The data processing unit generates a 2D grid or matrix 25 of cells to represent the lawn, and as the robot lawnmower 10 determines its position relative to the beacons 810, the data processing unit determines and saves the coordinates of each cell containing the robot lawnmower 10 during its motion. Each cell in grid 25 can have one of three possible mowing-area values indicating whether the cell is understood to be outside the perimeter 21 or NONMOWABLE, inside the perimeter 21 or MOWABLE, or on the area perimeter 21 BOUNDARY. In FIG. 6A, representative NONMOWABLE cells 25A, MOWABLE cells 25B, and BOUNDARY cells 25C are illustrated. Each cell of the grid 25 can be assigned (x, y) coordinates based on a chosen origin or reference position (0, 0) cell. Each cell can represent a square area, with each cell having a pre-determined length and width (e.g., between 5-20 cm, between 8-12 cm, about 10 cm). For example, the grid 25 can be a grid of cells, each 10 cm×10 cm. The robot lawnmower 10 stores the (x, y) coordinates of each cell traversed by the robot lawnmower along the actual teaching path 23 traveled during the teaching mode. The robot lawnmower 10 can mark the actual teaching path 23 as a simple line tracing the path of the robot 10 through single cells as shown in FIG. 6A. Alternatively the robot can mark all cells under the footprint of the robot as BOUNDARY cells 25C.

At the start of teaching, the values of all cells are initialized to NONMOWABLE. The operator presses the start button to start the teach process and then drives around the perimeter 21 of the mowing area. As the robot drives, the values of all cells along its actual teaching path 23 are set to BOUNDARY, the location of the cells being determined by the distance to the beacons 810. After walking the perimeter, the operator presses a button to end the teaching process. Then, the operator positions the robot lawnmower 10 anywhere within the mowable area of lawn 20, for example at position P, and presses a button, indicating to the robot lawnmower 10 that it is inside the perimeter. In response, the system performs a flood fill to set the values of all cells inside perimeter 21 defined by the BOUNDARY cells 25C to mark them as MOWABLE cells 25B corresponding to areas to be mowed.

Figure 6B:
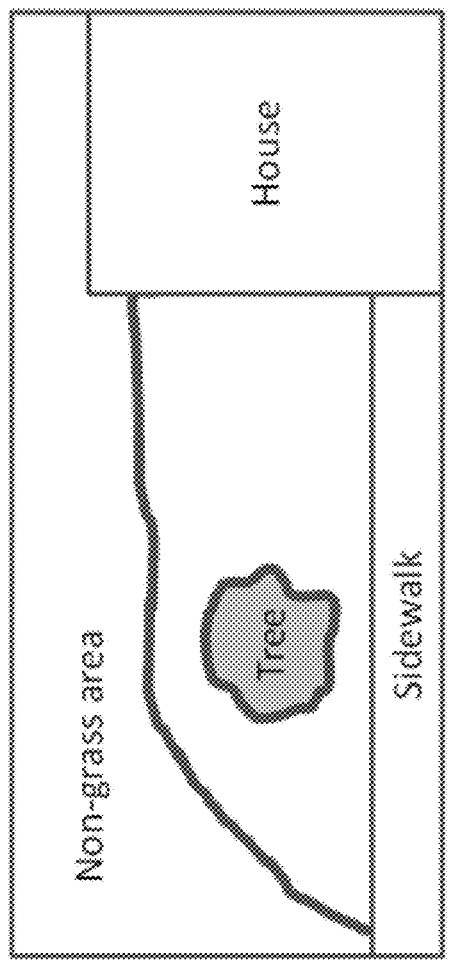
FIG. 6B shows a schematic of a lawn with desired mowable and non-mowable zones, including a keep-out zone.
Figure 6C:
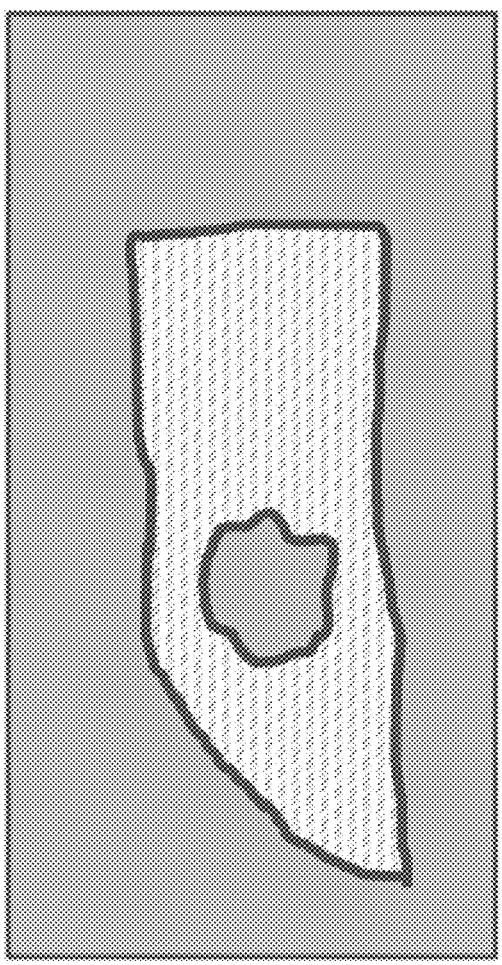
FIG. 6C is a schematic of a resulting mowable/non-mowable region determined by the robot for the lawn in FIG. 6B.
Figure 6D:
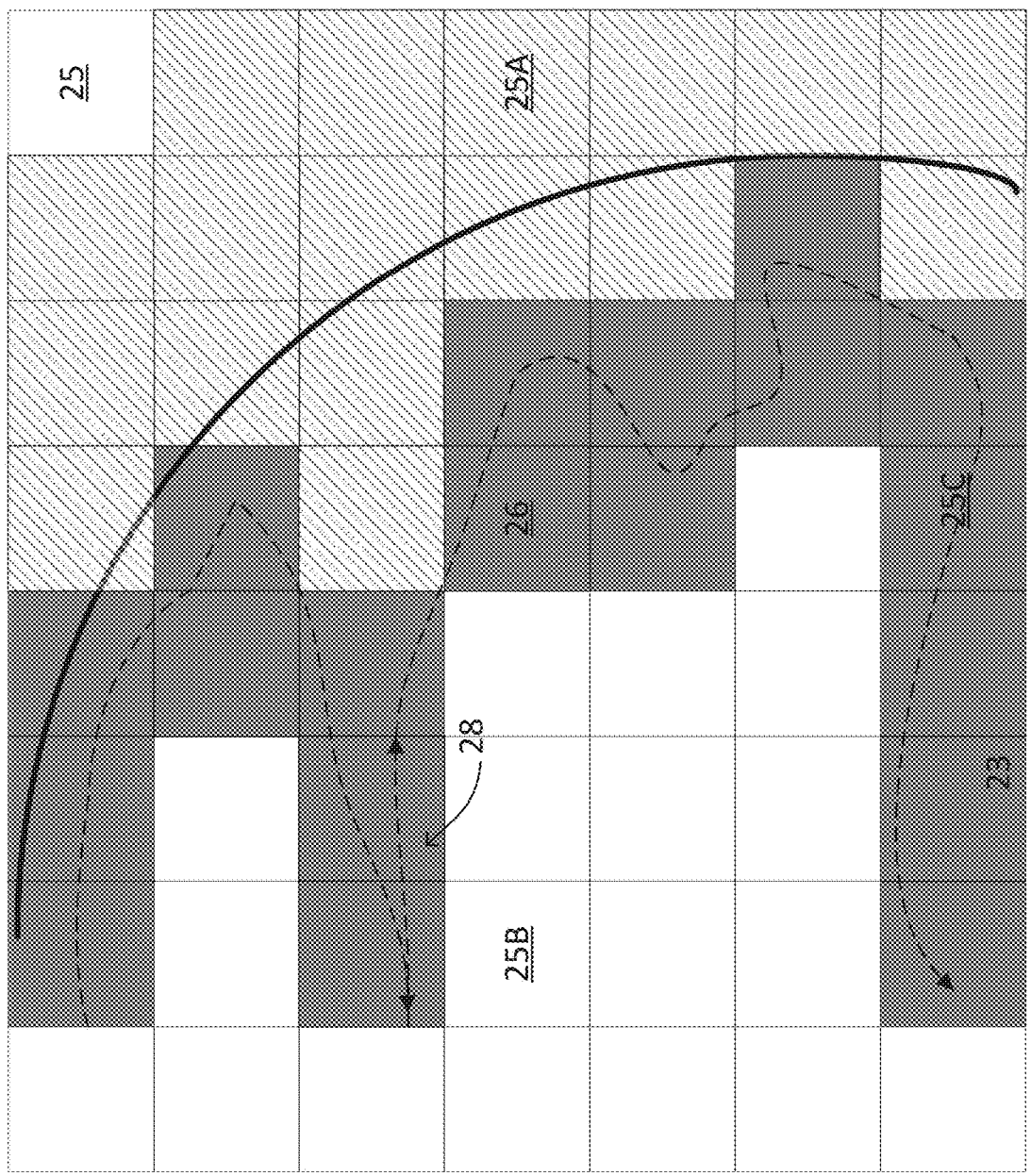
FIG. 6D is an initial 2D grid map view indicating interior, boundary, and exterior cells in response to the human operator performing a push/pull action to determine the lawn perimeter.

As shown in FIGS. 6B and 6C, keep-out zones can also be trained using a method similar to that for teaching the boundary. For example, to create a keep-out zone around a tree, the user can move the robot to a point on the boundary of the tree; put the robot into teach mode; push the robot around the tree; and then take the robot out teach mode. All of the cells traversed by the robot will be marked as BOUNDARY cells (e.g., as indicated by thick line in FIG. 6C), and the area inside this closed boundary will remain NONMOWABLE (e.g., the solid area) and the area inside the perimeter of the lawn and outside of the closed boundary will remain MOWABLE (e.g., as indicated by the hatched area in FIG. 6C).

Figure 6E:
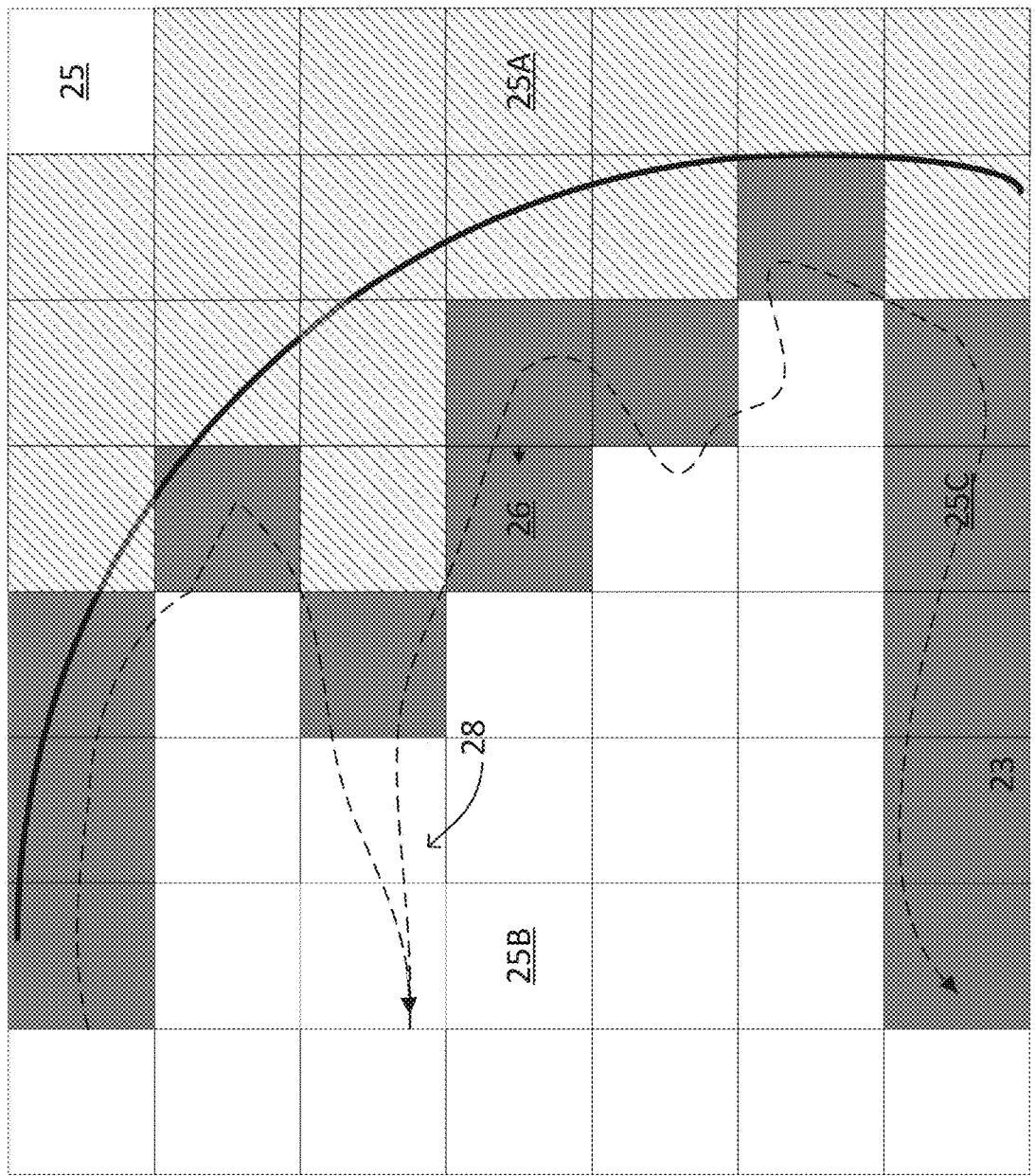
FIG. 6E is the map of FIG. 6D after selection of only exterior edge boundary cells.

FIG. 6E shows a close-up of a portion of the perimeter 21 containing a portion of an actual teaching path 23 navigated by the human operator and lawnmower robot lawnmower 10 during the teaching mode. Actual teaching path 23 includes non-smooth characteristics, such as a jag 28, resulting from where the human operator, for example, turned the robot lawnmower 10 and then partially retraced the path by pushing the robot lawnmower 10 backwards. NONMOWABLE cells 25A, MOWABLE cells 25B and BOUNDARY cells 25C are shown in hatch, white, and grey, respectively.

Figure 6F:
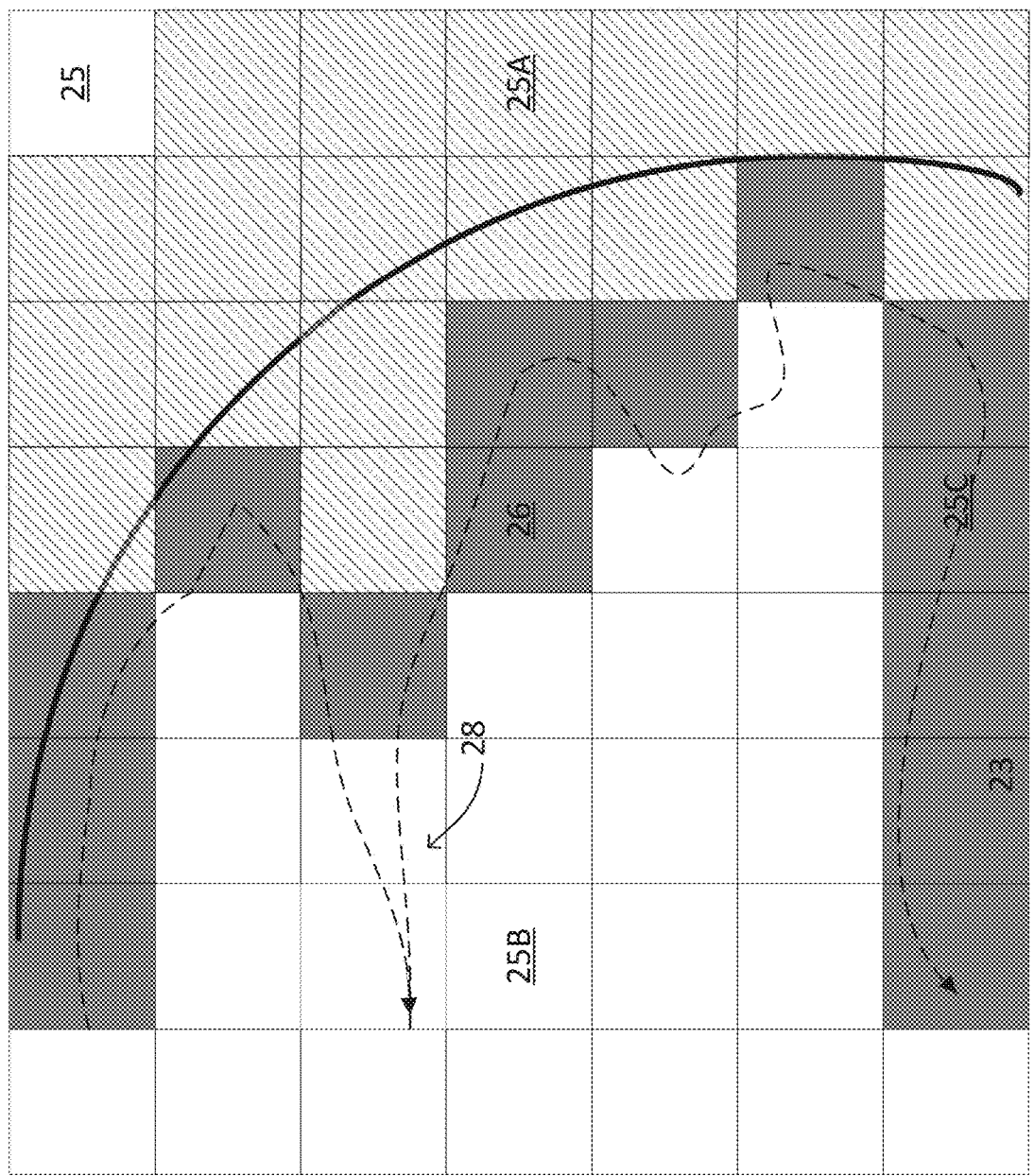
FIG. 6F is the map of FIG. 6E after smoothing with only exterior edge cells indicated as boundary.

FIG. 6F shows the grid map after performing an boundary smoothing function, in which the controller 150 has selected a subset of the initial BOUNDARY cell blocks by re-labeling any BOUNDARY cell that is not adjacent to both a MOWABLE and a NONMOWABLE cell as MOWABLE.

In some additional examples, the system can re-label some of the previous BOUNDARY cells 25C as MOWABLE cells 25B, in order to determine the outermost edges of the path to be followed by the robot lawnmower 10 when it navigates the lawn 20 autonomously at a later time. In the edge-selection function, the controller 150 selects all the BOUNDARY cells 25C and computes the distance between each BOUNDARY cell 25C to the origin (0, 0) cell. For example, the origin call can be the interior position cell P shown in FIG. 6A. The controller can calculate this distance given the known (x, y) coordinates determined for each BOUNDARY cell 25C.

The controller compares the distance of each BOUNDARY cell 25C to select the BOUNDARY 25C cells most distant from the origin P and determines a single-cell line of cells representing the outermost BOUNDARY cells 25C. The controller 150 examines the mowing-area value of each cell adjacent to each cell labeled BOUNDARY. Any BOUNDARY cell 25C that is in an adjacent position to more than one other BOUNDARY cell 25C is then examined to determine which cell 25C is furthest from the origin P and is thus the outermost limit to be mowed. To remove interior BOUNDARY cell 25C data points from the set of perimeter data, for subsets of the perimeter data representing multiple spatially adjacent locations the controller 150 selects only those cells spatially farthest from the reference or origin point P. Thus, in a grouping of cells which are contiguous to each other, the controller selects only the outermost (e.g., farthest away) cells. In FIG. 6F, interior cells which previously had a BOUNDARY-BOUNDARY border, have been relabeled as MOWABLE.

In some additional examples, the system can identify a gap, or break in the contiguous BOUNDARY cells. The controller 150 can search for such discontinuities, by searching for BOUNDARY cells that are not adjacent to or corner to corner with any other BOUNDARY cell. The controller 150 can then select MOWABLE cells adjacent to the discontinuous BOUNDARY cells. In one implementation, the controller 150 can interpolate between the x, y values of the discontinuous BOUNDARY cells, and reassign all cells lying on the line between the discontinuous cells as BOUNDARY cells. In some implementations, the controller 150 can alter a portion of the stored perimeter data set corresponding to a perimeter path segment defining an interior angle less than 135 degrees, to define a smoothed boundary. For example, the interior angle can be less than 90 degrees, or less than 45 degrees.

Figure 7:
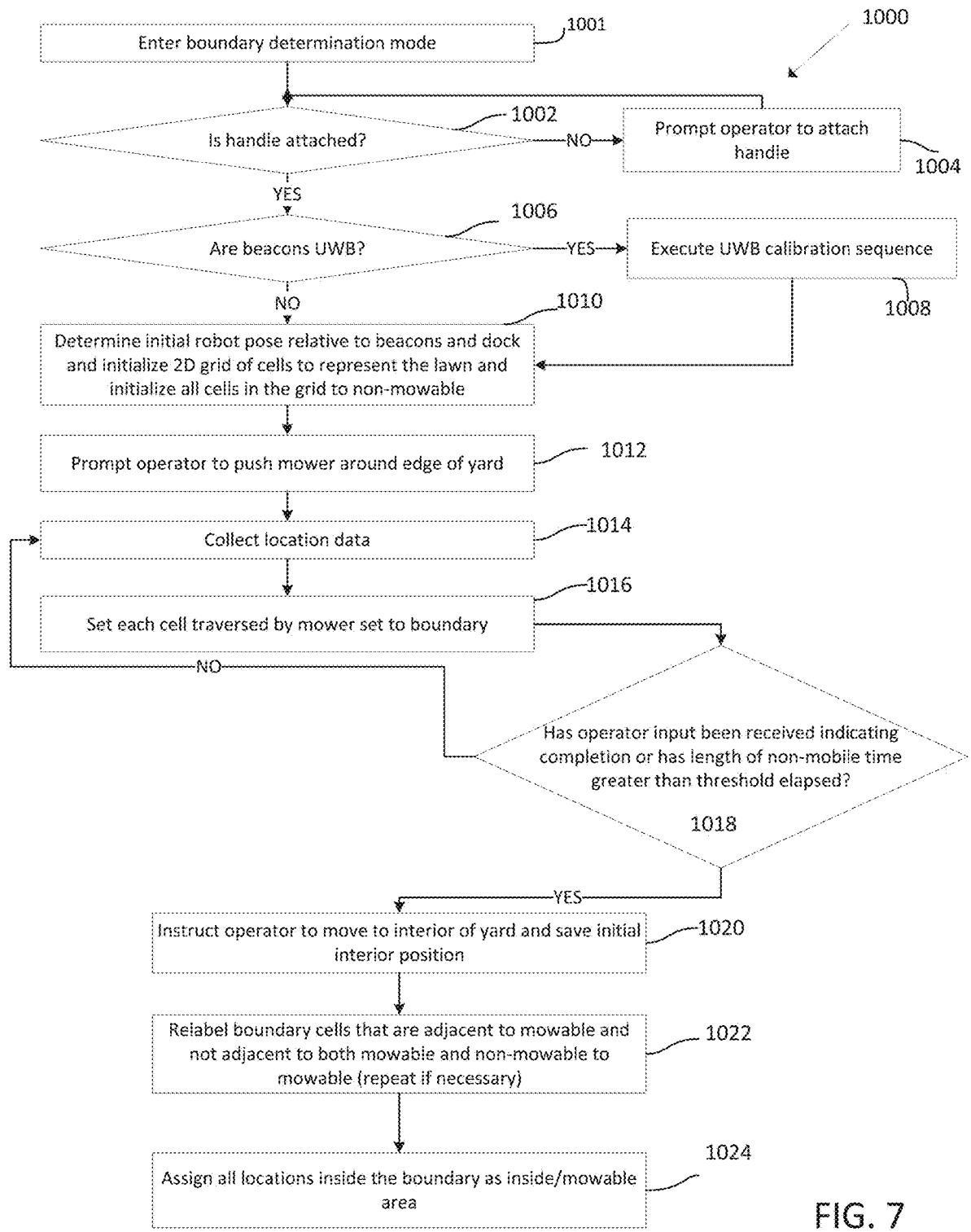
FIG. 7 is a flow chart of a method of determining a smoothed exterior boundary.

Referring again to FIG. 6A, a similar process can be used to define an inside boundary 29 of an interior area enclosed within the lawn which is not to be mowed. In the illustrated example, inside boundary 29 circumscribes a pond. After tracing the actual teaching path 23, the user navigates the robot lawnmower 10 along inside boundary 29 and then positions the robot lawnmower at a final position such as position P. This indicates that the lawnmower robot lawnmower 10 is located on MOWABLE area. The controller 150 then assigns the areas inside the inside boundary 29 as NOT MOWABLE, and outside actual teaching path 23, which is also NOT MOWABLE. Referring to FIG. 7, a method 1000 for teaching a robot lawnmower 10 the perimeter of an area within the lawn allows the robot to autonomously mow the lawn 20 at a later time. The method begins when the robot lawnmower 10 enters boundary determination mode (step 1001). The robot lawnmower 10 first monitors if teach mode can be used by checking if the handle 116 is attached (step 1002). If the robot determines that the handle 116 is not attached, the robot will prompt the user to attach the handle 116 (by, e.g., beeping, or flashing a light on the operator feedback unit). Once the robot lawnmower has determined that handle 116 is attached, the emitter communicates with the beacons in a UWB calibration sequence (as described above with respect to FIG. 2B) (step 1008). The robot lawnmower then determines its initial location relative to the beacons and the dock, and initializes a virtual 2D grid of cells around its initial location, to represent lawn 20 (step 1010). For example, the robot lawnmower 10 may determine the distance to the farthest beacon 810, and build a grid centered on the initial location, and extending on all sides by the distance to the farthest beacon.

At this point, the robot lawnmower is ready to begin teachable mode motion by the operator. The robot lawnmower prompts the operator to push the robot lawnmower around the perimeter of the lawn (step 1012). As the robot lawnmower is pushed by the operator, the controller is in communication with the beacons and collects location data (step 1014). For example, the robot can collect time of flight data from each of the UWB beacons and use the data to determine the location (e.g., by triangulation). Each cell of the 2D grid corresponding to a detected position of the robot during this motion is set to a value marking the cell as a boundary cell (step 1016). The robot lawnmower continuously checks if it has received operator input indicating completion, or whether a length of non-mobile time greater than a stored threshold time has elapsed (step 1018). If not, the robot lawnmower continues collecting location data and marking the cells corresponding to those locations as boundary cells.

Next, the operator may optionally define keep-out zones around any interior regions by pushing the mower around the internal boundary of these regions. Once at step 1018 the robot determines that the mapping of the perimeter is complete, the robot lawnmower prompts the operator to move the robot lawnmower 10 to a mowable, interior area of the lawn (i.e., the space to be mowed, step 1020), and then determines and saves the position of this initial interior position. The controller then identifies all boundary cells that are not adjacent to both mowable and non-mowable cells and relabels boundary cells that are adjacent to mowable or another boundary cell and not adjacent to non-mowable as mowable (step 1022) to calculate a final, smoothed boundary. Thus, in situations where multiple adjacent cells were identified initially as boundary, the system retains only the outermost cell as a boundary cell (e.g., the cell touching the non-mowable space) and relabels the other cells as mowable. For example, the re-labeling process selects the cells that are adjacent to only mowable cells and boundary cells and relabels those cells as mowable. The controller then uses a filling function to assign all locations inside the calculated smoothed boundary as inside/mowable area (step 1024).

In another example, once the robot determines that the mapping of the perimeter is complete and determines and saves the position of this initial interior position, the controller then selects the outermost locations of the boundary cells in the map and performs the edge selection and smoothing operation on selected cells to calculate a final, smoothed boundary. The controller then uses a filling function to assign all locations inside the calculated smoothed boundary as inside/mowable area.

Figure 8:
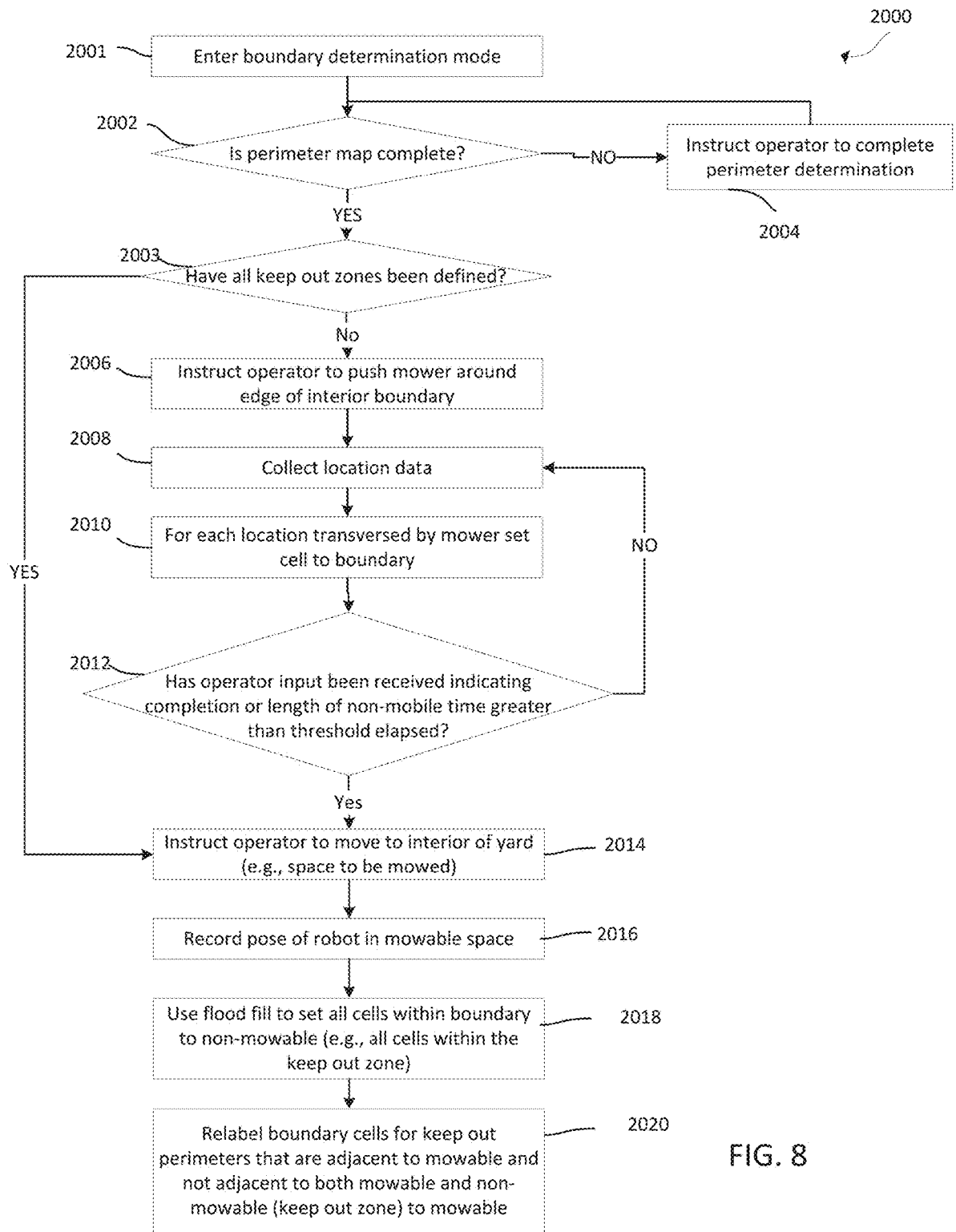
FIG. 8 is a flow chart of a method of determining a smoothed interior boundary.

Referring to FIG. 8, a method 2000 is shown for determining a boundary about an interior area not to be mowed (e.g., boundary 29 in FIG. 6A). The robot lawnmower 10 enters boundary determination mode (step 2001). The robot first checks if calculation of the outside perimeter boundary is complete (step 2002), and if not instructs the operator to complete the perimeter determination as described above (step 2004). The robot then determines whether all keep out zones (e.g., areas inside the defined perimeter of the lawn that should not be mowed such as flower beds, swing sets, ponds, etc.) have been defined (step 2003). The robot can determine whether all keep out zones have been defined by generating a prompt for a user to indicate whether the zones have been defined and receiving a response from the user indicative of their completion/non-completion. Is all keep out zones have been defined, the system proceeds to smoothing the boundaries of the keep out zones (step 2014). If all keep out zones have not been defined, the robot prompts the operator to push the robot lawnmower around the edge of any interior boundaries, if desired (step 2006). While the user pushes the robot lawnmower, the controller is in communication with, or otherwise monitors the location of, the beacons or boundary markers, and collects location data (step 2008). The value of each cell of the 2D grid corresponding to a location of the robot during this routine is set to BOUNDARY (step 2010). The robot continuously checks if it has received operator input indicating completion or whether a length of non-mobile time greater than a stored threshold time has elapsed (step 2012). If not, the robot lawnmower continues collecting location data and marking the cells of grid 25 corresponding to robot lawnmower's position as BOUNDARY cells.

The robot lawnmower then prompts the operator to move to a mowable area of the lawn (step 2014) within the outside perimeter border and not inside any of the (optional) keep-out zones, and records the pose of the robot in the mowable space (step 2016). The system then uses a flood fill to set all cells within the boundary to NON-MOWABLE (e.g., all of the cells that are within the keep out zone) (step 2018). Finally, the system re-labels boundary cells for keep out perimeters that are adjacent to mowable and not adjacent to both mowable and non-mowable (keep out zone) to mowable (step 2020).

In some additional examples, the system can perform the above-described smoothing operation on the entire grid map including both the interior boundaries of the keep out zones and the external perimeter in a single process. In such an example, the system uses a flood fill to fill all areas indicated by the robot pose in the mowable space. This flood fill sets all grid locations inside of the external perimeter of the lawn and outside of the defined keep out zones to MOWABLE. The system then performs a smoothing algorithm on both the perimeter of the lawn and the perimeters of the keep out zones. For example, the system can set all boundary cells that are not adjacent to both MOWABLE and NONMOWABLE to MOWABLE such that a boundary is generated where each boundary cell contacts both MOWABLE and NONMOWABLE space.

Figure 9A:
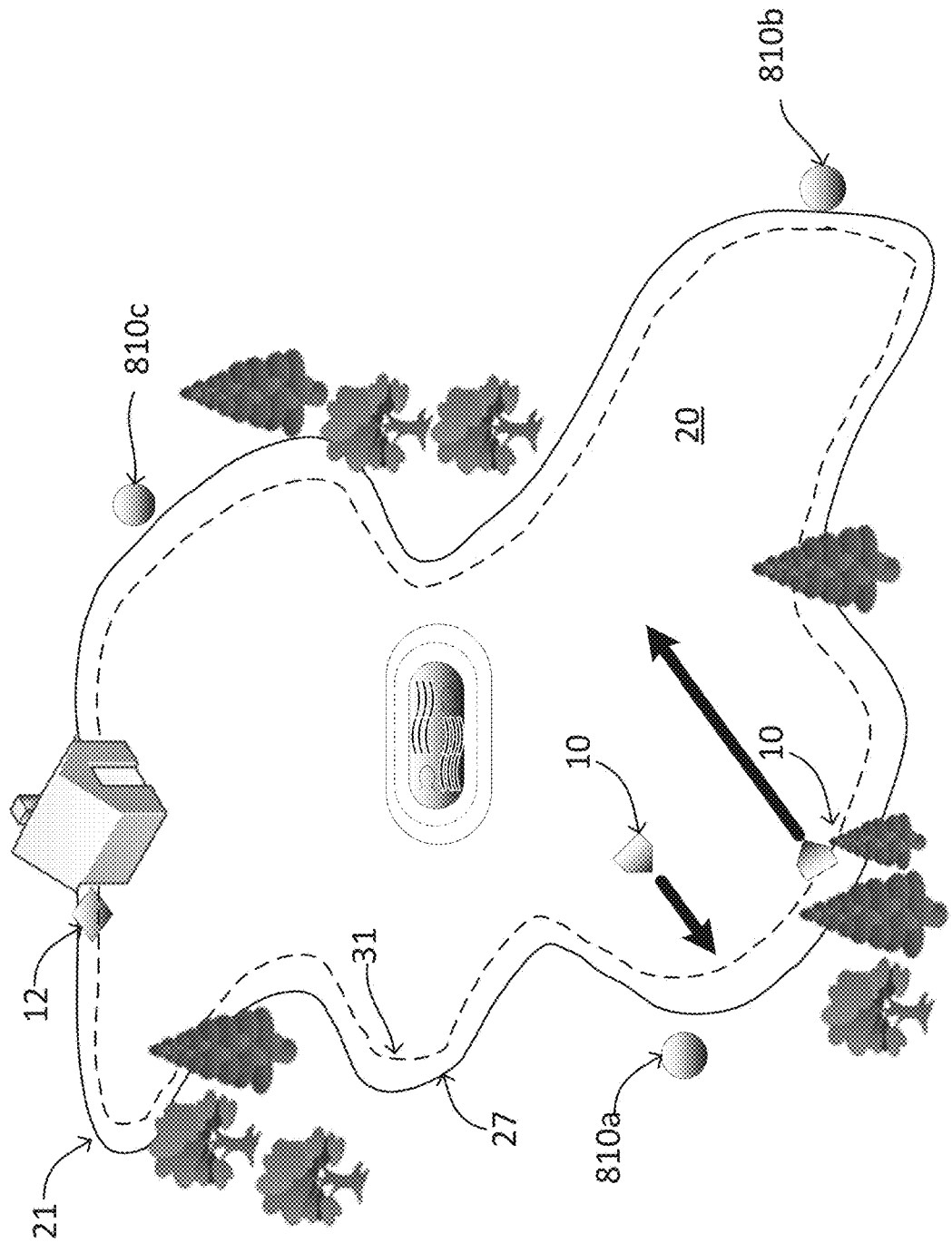
FIG. 9A is a schematic showing a "near boundary" or "caution" zone two feet from the boundary.
Figure 9B:
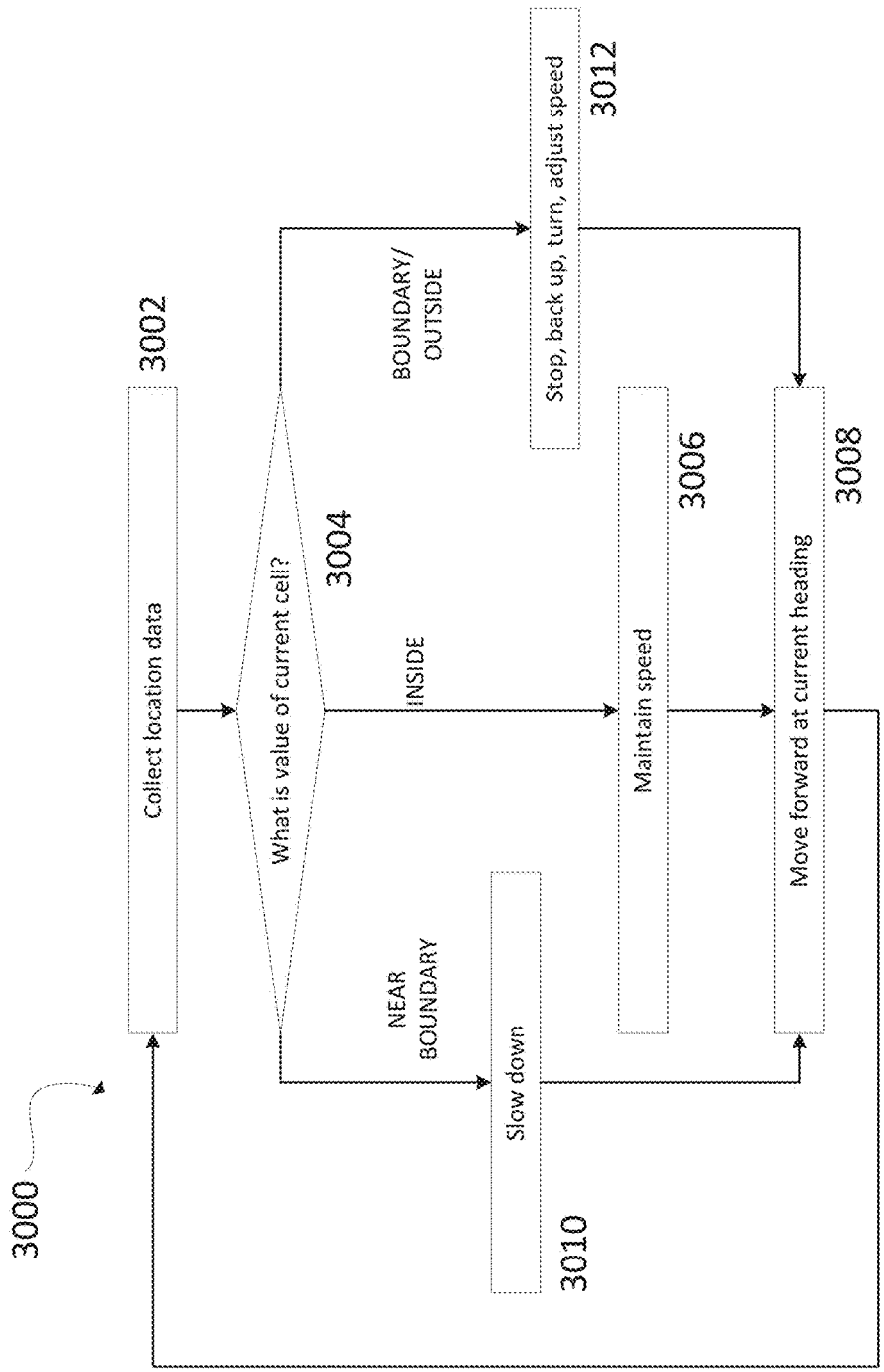
FIG. 9B is a flow chart of a process for speed/attitude adjustments performed by the robot while navigating the lawn.

Referring to FIGS. 9A and 9B, after the robot lawnmower 10 has completed the teaching mode it is ready to navigate the lawn 20 autonomously. Control of the robot lawnmower 10 during autonomous operation includes allowing the robot lawnmower to traverse the lawn 20 within the area delineated by the determined boundaries. Operation of the drive system can include a slow-down mode initiated when the robot lawnmower 10 approaches a boundary, to help prevent the robot lawnmower 10 accidentally rolling past the boundary. Additionally, a slow-down mode can also be implemented when the robot lawnmower 10 approaches a boundary marker 805. Referring to FIG. 9A, to implement a slow-down safety mode of operation, the robot controller determines a "near boundary" 31 equidistant from and inside the previously determined final smoothed outer boundary 27. Using the grid map and the final smoothed boundary 27, the controller 150 selects cells close to the BOUNDARY cells. For example, the controller 150 can select all MOWABLE cells that are adjacent to a BOUNDARY cell, and re-label the selected cells which are close to and touching the boundary as being NEAR BOUNDARY cells. The controller can select all MOWABLE cells that are adjacent to a NEAR BOUNDARY cell, and re-label the newly selected sells as NEAR BOUNDARY. This process can be completed until all cells previously marked MOWABLE that are within a fixed distance of the boundary are relabeled NEAR BOUNDARY. For example, all MOWABLE cells that are within, 0.35 m (2 feet) of the boundary 27 can be labeled as being NEAR BOUNDARY cells, or part of a caution zone. The remaining interior cells are in the safe zone and remain labeled as MOWABLE cells. This grid cell labeling effectively defines the near boundary line 31, equidistant at all or nearly all points from the actual outside boundary 27. The near boundary line 31 can also be smoothed, as described above with respect to the actual boundary line. A similar method of creating a NEAR BOUNDARY or caution zone can be employed for interior boundaries as well.

A method of autonomous control as the robot lawnmower navigates the lawn is shown in FIG. 9B. In the method 3000, the robot lawnmower continuously collects its location data and constructs a virtual map of labeled grid cells as described above (steps 3002 and 3004). If the robot determines that it is located in a MOWABLE or safe cell, the robot lawnmower continues driving forward at its current speed (step 3006) and heading (step 3008). When the robot is in this safe zone, it drives at full autonomous speed (0.5 m/s). If the robot lawnmower 10 determines that is in a NEAR BOUNDARY cell indicating the caution zone, it slows (to, e.g., 0.15 m/s), in step 3010. The two speeds can be determined by the update rate of the localization algorithm and the response time of the low-level motor control. In some examples, a ratio of the full autonomous speed to the near boundary speed can be between about 5:1 and about 2:1, e.g., about 5:1, about 4:1, about 3:1, about 2:1. When the robot reaches a BOUNDARY cell it adjusts its course to remain within the mowable area. For example, the robot lawnmower 10 can stop and back up immediately (step 3012). The robot then selects a random target point from MOWABLE cells in the mowable area. The target is selected so that it is at least a minimum distance from the nearest BOUNDARY cell and so that the path from the robot to the target passes through no more than a specified number of BOUNDARY or NON-MOWABLE cells. The robot then turns to face the target and resumes forward motion. In some preferred implementations, the resumed motion resumes with the robot lawnmower 10 following along a path close to the boundary, e.g., at a constant distance from the boundary. The robot lawnmower 10 can follow the boundary until a complete perimeter is mowed. The robot lawnmower 10 then may move a constant distance inside the MOWABLE area and complete another circuit, continuing on decreasing circuits until the lawn 20 is mowed. Alternatively, the robot may mow a complete perimeter, and then follow a series of parallel, adjacent lines until the MOWABLE area inside the boundary is completely traversed.

In a further embodiment, a method of smoothing the path of the robot lawnmower for later traversing of a boundary, can use the suspension of teaching mode feature discussed above. For example, when the user pulls the robot backwards to reposition the robot during teaching, a jagged path (such as jag 28 in FIG. 6E) results. As described above, this can place the robot lawnmower in an unteachable state, where teaching mode is automatically suspended. Teaching mode resumes when the robot lawnmower 10 detects it is moving forward again (within a threshold period of time).

Figure 10:
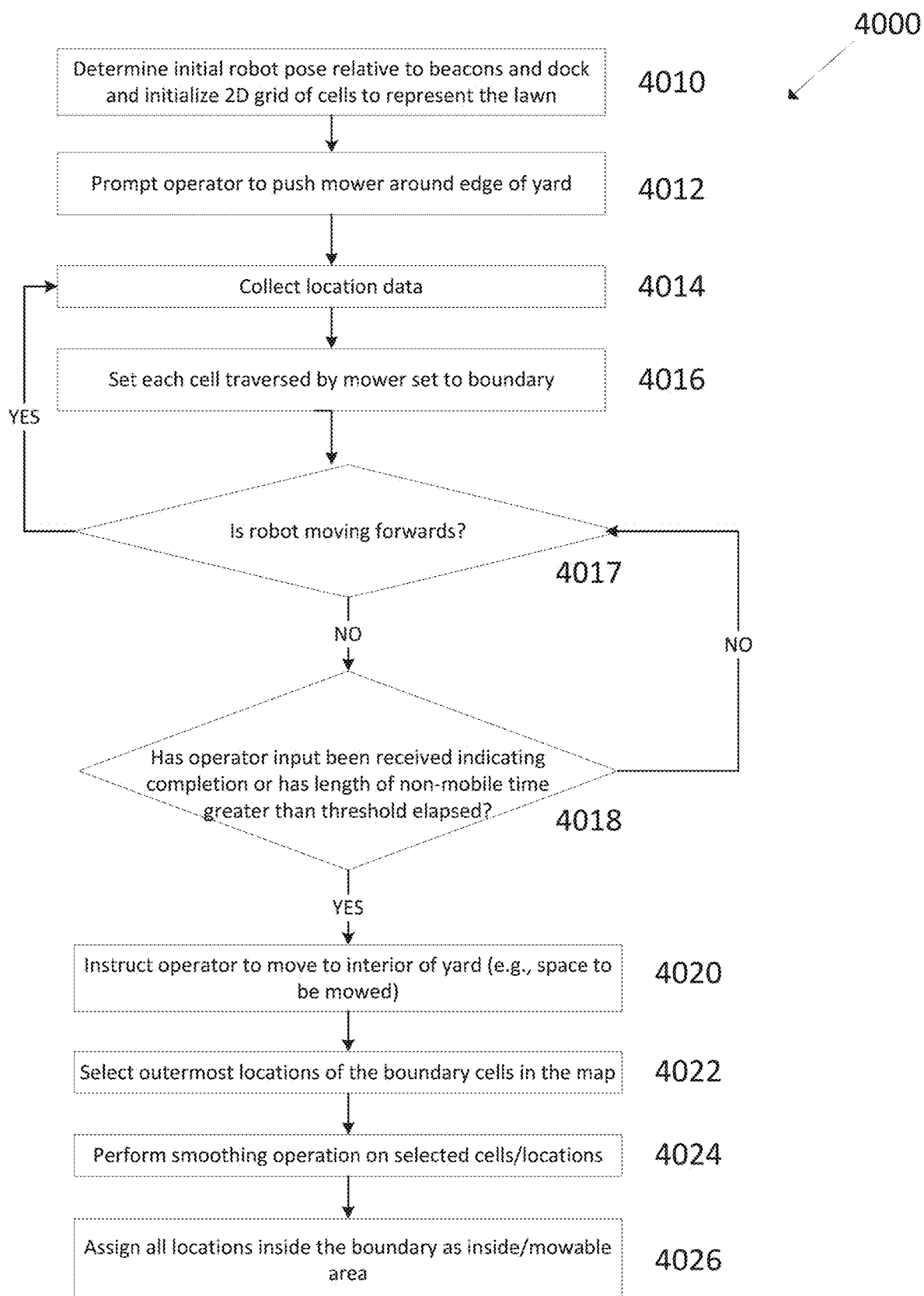
FIG. 10 is a flow chart of an alternative method for determining a smoothed boundary.

FIG. 10 describes an implementation of a method 4000 for teaching a robot lawnmower the perimeter of an area within the lawn allows the robot to autonomously mow the lawn at a later time which uses this suspension of teach mode. Prior to implementing method 4000, the robot lawnmower 10 follows steps similar to those described in FIG. 7, checking if handle 116 is attached and, if it determines that the handle 116 is not attached, prompting the user to attach the handle 116 (by, e.g., beeping, or flashing a light on the operator feedback unit). Once the robot lawnmower has determined that handle 116 is attached, the emitter communicates with the beacons or boundary markers, and determines if the beacons are UWB beacons. If so, the UWB calibration sequence (as described above with respect to FIG. 2B) is executed.

At this point the robot lawnmower then determines its initial location relative to the beacons 810 and the dock 12, and initializes a virtual 2D grid of cells around its initial location, to represent lawn (step 4010). The robot lawnmower 10 is ready to begin teachable mode motion by the operator and prompts the operator to push the robot lawnmower 10 around the perimeter 21 of the lawn 20 (step 4012). As the robot lawnmower 10 is pushed by the operator, the controller 150 is in communication with the beacons 810 and collects location data (step 4014). Each cell of the 2D grid corresponding to a detected position of the robot during this motion is set to a value marking it as a BOUNDARY cell (step 4016). The robot continuously checks if it is moving forward (step 4017). If so, the robot continues to collect location data and set each cell traversed to boundary (steps 4014 and 4016). If not, the robot checks whether it has received operator input indicating completion, or whether a length of non-mobile time greater than a stored threshold time has elapsed (step 4018) and again checks whether the robot is moving forward (step 4017). If so, the robot resumes collecting location data. Otherwise the robot determines (step 4018) whether the operator has indicated completion (or that time has run out), in which case the robot lawn-mower 10 determines that the mapping of the perimeter 21 is complete and prompts the operator to move to a mowable, interior area of the lawn (i.e., the space to be mowed, step 4020). The controller then selects the outermost locations of the boundary cells in the map (step 4022) and performs the smoothing operation on selected cells (step 4024) to calculate a final, smoothed boundary. The controller then uses a filling function to assign all locations inside the calculated boundary as inside/mowable area (step 4026).

In some examples, the grid established with MOWABLE, NONMOWABLE, and BOUNDARY cells can additionally be used to determine where the mobile robot should travel while mowing the lawn. For example, during a particular run of the robot (or over multiple different runs), the system can record information about coverage-type states for the robot. For example, the system can keep track of the number of time the robot has visited the cell (to mow it) during a particular run or across multiple runs. For example, the system could determine a pose of the robot and identify the associated location on the grid. Information associated with that grid location could then be updated to indicate that the robot had mowed the location. The robot could then identify cells that had either not been mowed during the current run or that had been mowed less frequently over a series of past mowing runs (e.g., over the past 3 runs) and mow those areas prior to mowing other areas. This would be helpful for covering areas adequately before moving to other areas.

While at least some of the examples above have been discussed in relation to the use of UWB beacons, the methods described herein can be used in systems having other beacon-based localization systems where distance is measured from the mobile asset (robot) to the beacons. Such technologies include but are not limited to time-of-flight (TOF), time distance of arrival (TDOA), or signal strength based systems.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, other embodiments are within the scope of the following claims.

What is claimed is:
1. A mowing robot comprising:
a grass cutter;
a drive system including a motorized wheel; and
a controller operably coupled to the motorized wheel for maneuvering the mowing robot to traverse a lawn area, the controller configured to:
control the mowing robot to autonomously mow within an area bounded by a boundary at a first speed, and
control the mowing robot to autonomously mow at a second speed slower than the first speed when the mowing robot is within a predetermined distance to the boundary.
2. The mowing robot of claim 1, wherein the controller is configured to adjust a mowing direction of the mowing robot in response to reaching the boundary.
3. The mowing robot of claim 2, wherein the controller is configured to control the mowing robot to mow along the boundary at the second speed.
4. The mowing robot of claim 1, wherein the first speed is slower than a manual operating speed of the mowing robot, and the mowing robot is configured to operate at the manual operating speed in response to a detachable push bar being connected to the mowing robot.
5. The mowing robot of claim 1, wherein the controller is configured to cause the mowing robot to autonomously mow at the second speed when the mowing robot is within the predetermined distance to the boundary, until the mowing robot reaches the boundary.
6. The mowing robot of claim 1, wherein the controller is configured to identify the boundary from stored geospatially referenced perimeter coordinates determined in a teaching mode.
7. The mowing robot of claim 1, wherein the controller is configured to:
determine a second boundary that is at a predetermined distance from and inside the first boundary,
control the mowing robot to mow at the first speed when the robot is within an area bounded by the second boundary, and
control the mowing robot to mow at the second speed when the mowing robot is on the second boundary, or between the second boundary and the first boundary.
8. The mowing robot of claim 7, wherein the controller is configured to:
identify cells of a two-dimensional data array as corresponding to the positions of the mowing robot;
identify cells within the first boundary and within the predetermined distance of the first boundary; and
determine the second boundary based on the cells that are within the first boundary and within the predetermined distance of the first boundary.
9. The mowing robot of claim 1, wherein the controller is configured to apply a smoothing function to the second boundary to smooth the second boundary.
10. A method of mowing an area with an autonomous mowing robot, the method comprising:
maneuvering, using a drive system including a motorized wheel, the mowing robot to traverse a lawn area;

controlling, using a controller operably coupled to the drive system, the mowing robot to autonomously mow within an area bounded by a predetermined boundary at a first speed; and controlling, using the controller, the mowing robot to autonomously mow at a second speed slower than the first speed when the mowing robot is within a predetermined distance to the predetermined boundary.

11. The method of claim 10, comprising storing, in non-transient memory of the robot, a set of geospatially referenced perimeter data corresponding to positions of the mowing robot as the mowing robot is guided about a perimeter of an area to be mowed.

12. The method of claim 11, comprising determining, at the controller, the boundary based on at least a portion of the stored set of geospatially referenced perimeter data.

13. The method of claim 10, comprising:

determining a second boundary that is at a predetermined distance from and inside the predetermined boundary, controlling the mowing robot to mow at the first speed when the robot is within an area bounded by the second boundary, and controlling the mowing robot to mow at the second speed when the mowing robot is on the second boundary, or between the second boundary and the predetermined boundary.

14. The method of claim 13, comprising:

identifying cells of a two-dimensional data array as corresponding to the positions of the mowing robot;

identifying cells that are within the predetermined boundary and within the predetermined distance of the predetermined boundary; and determining the second boundary based on the cells that are within the predetermined boundary and within the predetermined distance of the predetermined boundary.

\* \* \* \* \*